United States Patent
Kwak et al.

(10) Patent No.: US 11,108,515 B2
(45) Date of Patent: Aug. 31, 2021

(54) METHOD AND APPARATUS FOR TRANSMITTING REFERENCE SIGNAL IN MOBILE COMMUNICATION SYSTEM

(71) Applicant: Samsung Electronics Co., Ltd., Suwon-si (KR)

(72) Inventors: Youngwoo Kwak, Suwon-si (KR); Hoondong Noh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 7 days.

(21) Appl. No.: 16/327,624

(22) PCT Filed: Aug. 24, 2017

(86) PCT No.: PCT/KR2017/009269
§ 371 (c)(1),
(2) Date: Feb. 22, 2019

(87) PCT Pub. No.: WO2018/038556
PCT Pub. Date: Mar. 1, 2018

(65) Prior Publication Data
US 2019/0190673 A1  Jun. 20, 2019

(30) Foreign Application Priority Data

Aug. 24, 2016 (KR) .................. 10-2016-0107836
Oct. 7, 2016 (KR) .................. 10-2016-0129970

(51) Int. Cl.
*H04W 72/00* (2009.01)
*H04L 5/00* (2006.01)
(Continued)

(52) U.S. Cl.
CPC ......... *H04L 5/0048* (2013.01); *H04B 7/0421* (2013.01); *H04B 7/0626* (2013.01);
(Continued)

(58) Field of Classification Search
CPC ... H04L 5/0048; H04L 5/0044; H04L 5/0026; H04L 27/26; H04L 5/0091;
(Continued)

(56) References Cited

U.S. PATENT DOCUMENTS

2013/0322376 A1* 12/2013 Marinier .............. H04B 7/0617
  370/329
2014/0044040 A1* 2/2014 Chen ...................... H04J 11/005
  370/328
(Continued)

FOREIGN PATENT DOCUMENTS

WO  2017/135737 A1  8/2017

OTHER PUBLICATIONS

3GPP TS 36.213 V11.0.0 (Sep. 2012); 3rd Generation Partnership Project; Technical Specification Group Radio Access Network; Evolved Universal Terrestrial Radio Access (E-UTRA); Physical layer procedures (Release 11) (Year: 2016).*
(Continued)

Primary Examiner — Lan-Huong Truong
(74) Attorney, Agent, or Firm — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.

A method by which a terminal receives a signal in a mobile communication system, according to one embodiment of the present specification, comprises the steps of: receiving chan-
(Continued)

nel state information-reference signal (CSI-RS) mode information; and receiving a signal on the basis of the CSI-RS mode information. Unlike a conventional method of allowing a base station to periodically set the CSI-RS in a terminal at a predetermined position such that the terminal receives the CSI-RS and generates and reports channel state information, the present invention proposes a method by which a base station allocates, to a terminal, a reference signal transmission for enabling aperiodic generation of the channel state information for a system having various numbers of transmission antenna ports such as one, two, four, eight, twelve, sixteen or thirty-two transmission antenna ports, and receives the channel state information report. In addition, a method for transferring ZP CSI-RS and quasi co-location (QCL) information for supporting rate matching thereby is also proposed.

15 Claims, 16 Drawing Sheets

(51) Int. Cl.
  *H04B 7/06* (2006.01)
  *H04W 72/02* (2009.01)
  *H04B 7/0417* (2017.01)
  *H04W 72/04* (2009.01)
  *H04W 72/12* (2009.01)
  *H04L 27/26* (2006.01)

(52) U.S. Cl.
  CPC ......... *H04B 7/0634* (2013.01); *H04L 5/0026* (2013.01); *H04L 5/0044* (2013.01); *H04L 5/0091* (2013.01); *H04L 27/26* (2013.01); *H04W 72/02* (2013.01); *H04W 72/0446* (2013.01); *H04W 72/1273* (2013.01); *H04L 5/0035* (2013.01); *H04L 5/0082* (2013.01)

(58) Field of Classification Search
  CPC .. H04B 7/0626; H04B 7/0421; H04B 7/0634; H04W 72/02; H04W 72/0446; H04W 72/1273
  See application file for complete search history.

(56) References Cited

U.S. PATENT DOCUMENTS

| | | | | |
|---|---|---|---|---|
| 2014/0092829 | A1* | 4/2014 | Han | H04L 5/0053 370/329 |
| 2015/0162966 | A1* | 6/2015 | Kim | H04B 7/0617 370/252 |
| 2015/0365178 | A1* | 12/2015 | Maattanen | H04L 5/1438 370/329 |
| 2016/0227548 | A1* | 8/2016 | Nimbalker | H04L 5/0051 |

OTHER PUBLICATIONS

3GPP CATT, "Support of aperiodic CSI-RS", R1-166442, 3GPP TSG RAN WG1 Meeting #86, Gothenburg, Sweden, Aug. 13, 2016, See sections 1-2 (Year: 2016).*
Nokia et al., "Aperiodic CSI-RS and Overhead Reduction", R1-166340, 3GPP TSG RAN WG1 Meeting #86, Gothenburg, Sweden, Aug. 12, 2016, See section 2.
Samsung, "Additional details on aperiodic CSI-RS", R1-166728, 3GPP TSG RAN WG1 Meeting #86, Gothenburg, Sweden, Aug. 12, 2016, See section 2 and figure 1.
ZTE Corporation et al., "Aperiodic CSI-RS for Non-Precoded CSI-RS", R1-166325, 3GPP TSG RAN WG1 Meeting #86, Gothenburg, Sweden, Aug. 13, 2016, See section 3.
CATT, "Support of aperiodic CSI-RS", R1-166442, 3GPP TSG RAN WG1 Meeting #86, Gothenburg, Sweden, Aug. 13, 2016, See sections 1-2.

* cited by examiner

PDCCH RE

CSI-RS RE

CRS RE

FIG. 8

METHOD AND APPARATUS FOR TRANSMITTING REFERENCE SIGNAL IN MOBILE COMMUNICATION SYSTEM

TECHNICAL FIELD

The present invention relates to a method for transmitting and receiving a reference signal for signal transmission and reception in a mobile communication system and an apparatus using the method.

More particularly, the present invention relates a method for CSI-RS transmission and channel state feedback in a communication system, and an apparatus using the method.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The present invention provides a method and apparatus for a terminal to measure interference and generate channel state information in a mobile communication system where a base station (Evolved Node B, eNB) performs MIMO transmission using a plurality of transmit antennas.

In contrast to early mobile communication systems having provided voice-oriented services only, to provide data services and multimedia services, current mobile communication systems are evolving into high-speed and high-quality wireless packet data communication systems. Recently, various mobile communication standards, such as 3GPP high speed downlink packet access (HSDPA), high speed uplink packet access (HSUPA), long term evolution (LTE), LTE-advanced (LTE-A), 3GPP2 high rate packet data (HRPD), and IEEE 802.16, have been developed to provide high-speed and high-quality packet data services. In particular, the LTE system is developed to efficiently support high-speed wireless packet data transmission and tries to maximize the wireless system capacity by utilizing various wireless access technologies. The LTE-A system is an advanced version of the LTE system and supports improved data transmission capabilities compared to the LTE system.

In general, LTE refers to the base station and terminal equipment corresponding to 3GPP Release 8 or 9, and LTE-A refers to the base station and terminal equipment corresponding to 3GPP Release 10. In the 3GPP standards body, even after standardization of the LTE-A system, standardization is being carried out for the subsequent systems with improved performance.

The existing 3G and 4G wireless packet data communication systems including HSDPA, HSUPA, HRPD, LTE, and LTE-A systems employ various technologies such as adaptive modulation and coding (AMC) and channel sensitive scheduling in order to increase transmission efficiency. By use of AMC, the transmitter can adjust the amount of transmission data according to the channel state. That is, when the channel state is not acceptable, the transmitter can reduce the amount of transmission data so as to adjust the probability of a reception error to a desired level; and when the channel state is acceptable, the transmitter can increase the amount of transmission data so as to effectively deliver a large amount of information while adjusting the probability of a reception error to a desired level. By use of resource management based on channel-sensitive scheduling, the transmitter may selectively provide a service to a user with a good channel state among multiple users, increasing the system throughput in comparison to assigning a channel to one user and providing a service to the user. Such throughput increment is referred to as multi-user diversity gain. Namely, AMC and channel-sensitive scheduling are methods that enable the transmitter to apply an appropriate modulation and coding technique at the most efficient point in time determined on the basis of partial channel state information fed back from the receiver.

When AMC is used together with multiple input multiple output (MIMO) transmission, it may also determine the number of spatial layers (or rank) for the transmitted signal.

In this case, to determine the optimal data rate, AMC may consider not only the coding rate and modulation scheme but also the number of layers used for transmission using MIMO.

Recently, studies have been actively conducted to make a transition from code division multiple access (CDMA) being a multiple access scheme for 2G and 3G mobile communication systems to orthogonal frequency division multiple access (OFDMA) in the next generation system. 3GPP and 3GPP2 have initiated standardization of evolutionary systems using OFDMA. A larger capacity increase can be expected in the OFDMA scheme compared with the CDMA scheme. One of many causes of capacity increase in the OFDMA scheme is that it is possible to apply frequency domain scheduling. Just as a capacity gain is obtained through channel-sensitive scheduling according to the time-varying nature of the channel, more capacity gain can be obtained if it is possible to utilize the nature of the channel changing with frequency.

Accordingly, there is a need for a method and apparatus that perform reference signal transmission and channel information feedback in a communication system.

DISCLOSURE OF INVENTION

Technical Problem

The CSI-RS overhead has increased in a mobile communication system owing to an increase in the number of antennas supported by the base station and the necessity of per-terminal CSI-RS functionality to support the UE-specific beamformed CSI-RS technology. Hence, for efficient system and CSI-RS operation management, there is a need for a method and apparatus that enable the base station to allocate an aperiodic CSI-RS (other than the existing periodic CSI-RS) to a terminal as necessary and enable the terminal to report channel state information based on the aperiodic CSI-RS.

Accordingly, the present invention proposes a method that enables the base station to assign CSI-RS resource information in advance to the terminal and trigger it so as to allocate an aperiodic CSI-RS to the terminal. The aperiodic CSI-RS can be configured based on the CSI-RS RE supported by the existing Release 13 specification. Alternatively, only the CSI-RS can be transmitted in a specific subframe, subband or RB without PDSCH transmission. In the first option, a CSI-RS pool may be formed based on a plurality of existing CSI-RS settings, and the base station can allocate a CSI-RS aperiodically. In the second option, the PDSCH is not transmitted in the corresponding RB and a DMRS for PDSCH decoding is not required correspondingly. As this resource is allocated dynamically based on the PCFICH, the amount of resources may vary depending on the situation, and thus the port indexing must also be changed. The present invention proposes a method and apparatus for handling configurations, allocations, and procedures related to aperiodic CSI-RS transmission.

Solution to Problem

In accordance with an aspect of the present invention, there is provided a method for a terminal to receive signals in a mobile communication system. The method may include: receiving channel state information-reference signal (CSI-RS) mode information; and receiving a signal based on the CSI-RS mode information.

In accordance with another aspect of the present invention, there is provided a method for a base station to transmit signals in a mobile communication system. The method may include: transmitting channel state information-reference signal (CSI-RS) mode information; and transmitting a signal based on the CSI-RS mode information.

In accordance with another aspect of the present invention, there is provided a terminal in a mobile communication system. The terminal may include: a transceiver configured to transmit and receive a signal; and a controller associated with the transceiver and configured to receive channel state information-reference signal (CSI-RS) mode information and to receive a signal based on the CSI-RS mode information.

In accordance with another aspect of the present invention, there is provided a base station in a mobile communication system. The base station may include: a transceiver configured to transmit and receive a signal; and a controller associated with the transceiver and configured to transmit channel state information-reference signal (CSI-RS) mode information and to transmit a signal based on the CSI-RS mode information.

Advantageous Effects of Invention

In a feature of the present invention, for semi closed-loop MIMO transmission, precoder cycling can be applied within one RE based on the DMRS. In this case, a plurality of RBs can be transmitted as a bundle to support eight or more precoders. In addition, it is possible to perform transmission through multiple layers and terminals by use of the offset.

BRIEF DESCRIPTION OF DRAWINGS

FIG. 8 depicts resource allocation for PDSCH transmission through downlink resource allocation type 2 in the LTE system.

MODE FOR THE INVENTION

Figure 1:
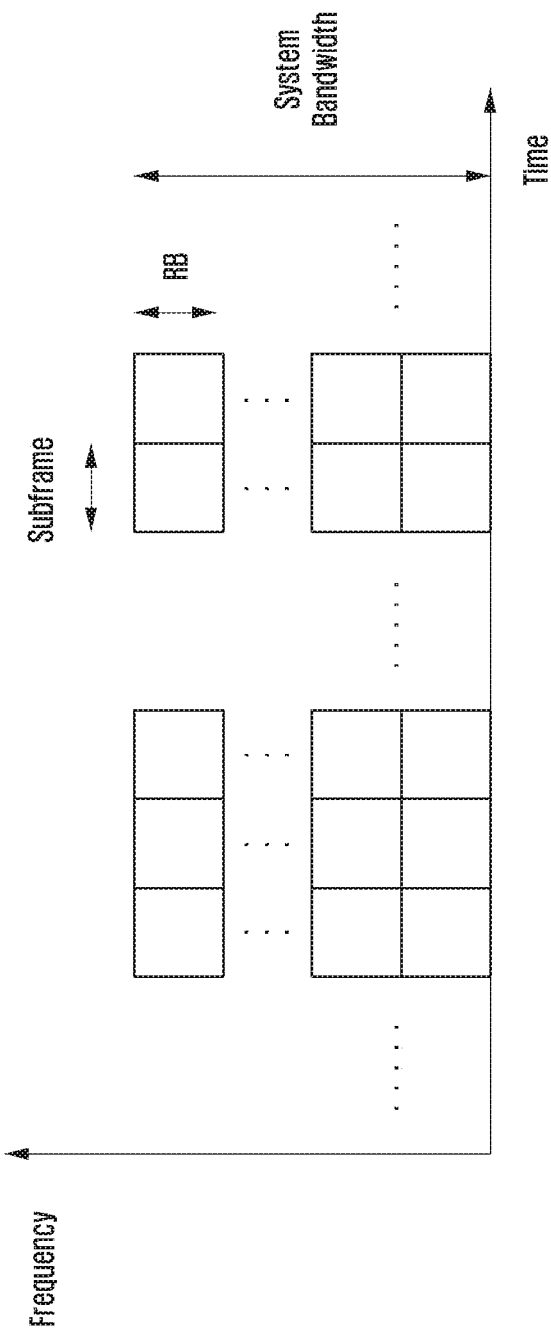
FIG. 1 illustrates time and frequency resources in the LTE system.

Hereinafter, embodiments of the present invention are described in detail with reference to the accompanying drawings. Descriptions of well-known functions and structures incorporated herein may be omitted to avoid obscuring the subject matter of the present invention. The terms described below are defined in consideration of their functions in the present invention, and these may vary depending on the intention of the user, the operator, or the custom. Hence, their meanings should be determined based on the overall contents of this specification.

The aspects, features, and advantages of certain embodiments of the present invention will be more apparent from the following detailed description taken in conjunction with the accompanying drawings. The description of the various embodiments does not describe every possible instance of the present invention. It should be apparent to those skilled in the art that the following description is provided for illustrative purposes only and not for the purpose of limiting the present invention as defined by the appended claims and their equivalents. The same reference symbols are used throughout the description to refer to the same parts.

Meanwhile, it is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. As the computer program instructions may be stored in a computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out steps of functions described in the flowchart.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed at the same time or executed in reverse order.

In the description, the word "unit", "module", or the like may refer to a software component or hardware component such as an FPGA or ASIC capable of carrying out a function or an operation. However, "unit" or the like is not limited to hardware or software. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays, or variables. A function provided by a component and unit may be a combination of smaller components and units, and it may be combined with others to compose large components and units. Components and units may be configured to drive a device or one or more processors in a secure multimedia card.

Descriptions of well-known functions and structures incorporated herein may be omitted to avoid obscuring the subject matter of the present invention. Particular terms may be defined to describe the invention in the best manner Hence, the meaning of specific terms or words used in the specification and the claims should be construed in accordance with the spirit of the present invention.

The CSI-RS overhead has increased in a mobile communication system owing to an increase in the number of antennas supported by the base station for FD-MIMO and the necessity of per-terminal CSI-RS functionality to support the UE-specific beamformed CSI-RS technology. Hence, for efficient system and CSI-RS operation management, there is a need for a method that enables the base station to allocate an aperiodic CSI-RS (other than the existing periodic CSI-RS) to a terminal as necessary and enables the terminal to report channel state information based on the aperiodic CSI-RS.

In the following description, LTE (long term evolution) and LTE-A (LTE-Advanced) systems are taken as an example for describing the present invention. However, the present invention is applicable to other communication systems using licensed and unlicensed bands without significant modification.

Next, a description is given of a method for configuring a plurality of CSI-RS ports in consideration of one or more of the items described above.

FIG. 1 illustrates time and frequency resources in the LTE/LTE-A system.

With reference to FIG. 1, the radio resources transmitted from the base station (eNB) to the terminal (user equipment (UE)) are divided into resource blocks (RBs) in the frequency domain and are divided into subframes in the time domain. In the LTE/LTE-A system, each RB generally includes twelve subcarriers and occupies a band of 180 kHz. In the LTE/LTE-A system, a subframe is generally composed of 14 OFDM symbols and occupies a time duration of 1 msec. For scheduling, the LTE/LTE-A system can allocate resources in units of subframes in the time domain and allocate resources in units of RBs in the frequency domain.

Figure 2:
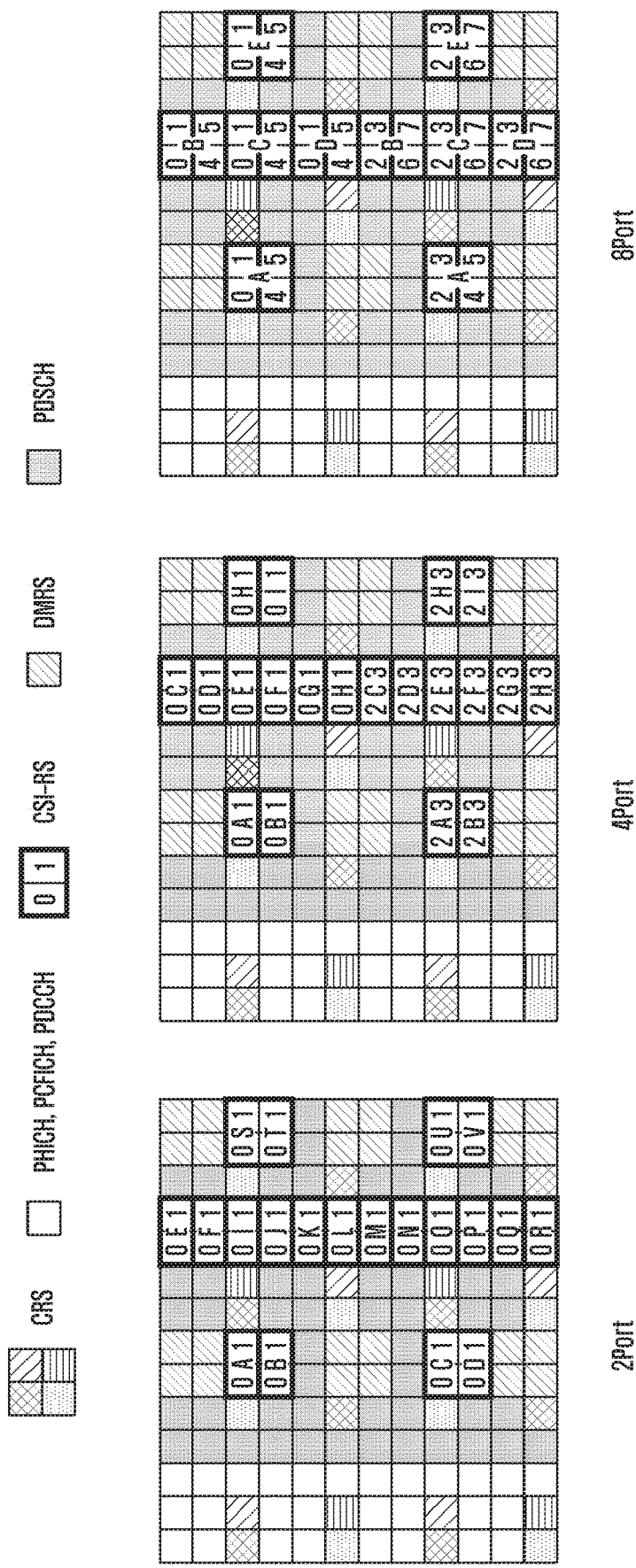
FIG. 2 depicts CSI-RS transmissions with 2, 4, and 8 antenna ports in the LTE system.

FIG. 2 depicts CSI-RS transmissions with 2, 4, and 8 antenna ports using radio resources of 1 subframe and 1 RB which are the minimum unit for downlink scheduling in the LTE/LTE-A system.

In FIG. 2, the illustrated radio resources are composed of one subframe in the time domain and one RB in the frequency domain. Such radio resources are composed of 12 subcarriers in the frequency domain and 14 OFDM symbols in the time domain, thereby providing a total of 168 frequency-time positions. In LTE/LTE-A, each frequency-time position in FIG. 2 is referred to as a resource element (RE).

The radio resources shown in FIG. 2 can be used to transmit the following different types of signals.

1. CRS (cell specific reference signal): this is a reference signal transmitted for all terminals in one cell 2. DMRS (demodulation reference signal): this is a reference signal transmitted for a specific terminal and is used to perform channel estimation to recover information carried by the PDSCH. One DMRS port is transmitted with the same precoding as the PDSCH layer associated therewith. The terminal wishing to receive a specific layer of the PDSCH may receive the DMRS port associated with the layer and perform channel estimation to restore information carried by the layer.

3. PDSCH (physical downlink shared channel): this is a data channel transmitted in the downlink, and is used by the base station to transmit traffic to the terminal. The PDSCH is transmitted by using an RE through which a reference signal is not transmitted in the data region of FIG. 2.

4. CSI-RS (channel status information reference signal): this is a reference signal transmitted for terminals belonging to one cell and is used for channel state measurement. A plurality of CSI-RSs may be transmitted in one cell.

5. ZP CSI-RS (zero power CSI-RS): this indicates that the actual signal is not transmitted at the position where the CSI-RS is transmitted.

6. IMR (interference measurement resource): this corresponds to a position where the CSI-RS is transmitted, and one or more of the positions labelled A, B, C, D, E, F, G, H, I and J in FIG. 2 can be set as an IMR. The terminal can perform interference measurement under an agreement that all signals received at the REs set as an IMR are interference.

7. Other control channels (physical hybrid-ARQ indicator channel (PHICH), physical control format indicator channel (PCFICH), physical downlink control channel (PDCCH)): These control channels are used to provide control information required by the terminal to receive the PDSCH or used to transmit ACK/NACK information for operating HARQ with respect to an uplink data transmission.

In addition to the signals described above, the LTE-A system may configure a zero power CSI-RS so that a CSI-RS from another base station can be received by terminals of the corresponding cell without interference. The zero power CSI-RS (muting) may be applied to a position where a CSI-RS can be transmitted, and the terminal receives a traffic signal normally by skipping the corresponding radio resource. In the LTE-A system, the zero power CSI-RS is also referred to as muting. This is because muting is applied to the CSI-RS position and transmission power is not transmitted due to the characteristic of muting.

In FIG. 2, the CSI-RS may be transmitted using at least some of the positions labelled A, B, C, D, E, F, G, H, I and J according to the number of antennas for CSI-RS transmission. Muting may also be applied to some of the positions labelled A, B, C, D, E, F, G, H, I and J. In particular, the CSI-RS may be transmitted via two, four or eight REs depending on the number of antenna ports for CSI-RS transmission. In FIG. 2, when the number of antenna ports is two, the CSI-RS is transmitted through a half of a specific pattern; when the number of antenna ports is four, the CSI-RS is transmitted through the whole of a specific pattern; and when the number of antenna ports is eight, the CSI-RS is transmitted using two patterns. In contrast, muting is always applied on a pattern basis. That is, muting may be applied to multiple patterns, but cannot be applied to only a part of one pattern unless the muted position overlaps a CSI-RS position. Muting may be applied to a part of one pattern only when the muted position overlaps a CSI-RS position.

When the CSI-RS is transmitted for 2 antenna ports, CSI-RSs for the two antenna ports are transmitted through two REs adjacent in the time domain and the signals of the individual antenna ports are separated by using orthogonal codes. When the CSI-RS is transmitted for 4 antenna ports, CSI-RSs for two antenna ports are transmitted through two REs in the same way as above and CSI-RSs for the remaining two antenna ports are transmitted through additional two REs in the same way. The same process may be applied to the case where the CSI-RS is transmitted for 8 antennas ports.

The base station may boost the transmission power of the CSI-RS to improve channel estimation accuracy. When the CSI-RS is transmitted for four or eight antenna ports (AP), a particular CSI-RS port is transmitted only via a CSI-RS RE at a specified position and is not transmitted via a different OFDM symbol in the same OFDM symbol group.

In addition, the terminal may be allocated a CSI-IM (or IMR (interference measurement resource)) together with a CSI-RS. The CSI-IM resource has the same configuration and position as the CSI-RS supporting 4 ports. The CSI-IM is a resource used by a terminal that receives data from one or more base stations to accurately measure the interference from a neighboring base station. For example, to measure the amount of interference when a neighboring base station transmits data and the amount of interference when the neighboring base station does not transmit data, the base station may configure the CSI-RS and two CSI-IM resources, and it may cause one CSI-IM resource to always transmit the signal from the neighbor base station and cause the other CSI-IM resource not to transmit the signal from the neighbor base station. Thereby, the amount of interference from the neighboring base station can be effectively measured.

In the LTE-A system, the base station can notify the terminal of CSI-RS configuration information through higher layer signaling. The CSI-RS configuration may include the index of the CSI-RS configuration, the number of ports included in the CSI-RS, the transmission period of the CSI-RS, the transmission offset, CSI-RS resource configuration information, CSI-RS scrambling ID, QCL information, and the like.

In FIG. 2, two options may be used for CSI-RS transmission according to the number of CSI-RSs to be transmitted. To transmit 8 CSI-RSs or less (i.e., 1, 2, 4, or 8 CSI-RSs), the CSI-RS may be transmitted using some of the positions labelled A, B, C, D, E, F, G, H, I and J in FIG. 2 according to the number of antennas for CSI-RS transmission. The zero power CSI-RS (muting) may also be applied to some of the positions labelled A, B, C, D, E, F, G, H, I and J. In particular, the CSI-RS may be transmitted via two, four or eight REs depending on the number of antenna ports. In FIG. 2, when the number of antenna ports is two, the CSI-RS is transmitted through a half of a specific pattern; when the number of antenna ports is four, the CSI-RS is transmitted through the whole of a specific pattern; and when the number of antenna ports is eight, the CSI-RS is transmitted using two patterns. In contrast, the zero power CSI-RS (muting) is always applied on a pattern basis. That is, muting may be applied to multiple patterns, but cannot be applied to only a part of one pattern unless the muted position overlaps a CSI-RS position. Muting may be applied to a part of one pattern only when the muted position overlaps a CSI-RS position.

When the CSI-RS is transmitted for 2 antenna ports, signals for the two antenna ports are respectively transmitted through two REs adjacent in the time domain and the signals of the individual antenna ports are code division multiplexed (CDM) using orthogonal codes. When the CSI-RS is transmitted for 4 antenna ports, signals for two antenna ports are respectively transmitted through two REs in the same way as above and signals for the remaining two antenna ports are respectively transmitted through additional two REs in the same way. The same process may be applied to the case where the CSI-RS is transmitted for 8 antennas ports.

To transmit 12 or 16 CSI-RSs being more than 8 CSI-RSs, the existing 4 or 8 CSI-RS positions are combined through RRC settings to transmit 12 or 16 CSI-RSs. In other words, to transmit 12 CSI-RSs, three 4-port CSI-RS positions are bundled and transmitted as one 12-port CSI-RS. To transmit 16 CSI-RSs, two 8-port CSI-RS positions are bundled and transmitted as one 16-port CSI-RS. Unlike the existing 8 port or less CSI-RS transmission, 12 and 16-port CSI-RS transmission supports CDM of size 4. The existing 8 port or less CSI-RS supports CDM2, and it can support power boosting up to 6 dB with respect to 8 ports by overlapping CSI-RS 2 ports with 2 time symbols, achieving full power utilization for CSI-RS transmission. However, in the case of 12-port or 16-port CSI-RS, full power utilization for CSI-RS transmission cannot be achieved with the combination of CDM2 and 6 dB. In such a case, CDM4 helps to achieve full power utilization.

In a cellular system, the base station has to transmit a reference signal to the terminal to measure the downlink channel state. In the 3GPP LTE-A system, the terminal measures the channel state between the base station and the terminal by using the CRS or CSI-RS transmitted from the base station. Channel state measurement basically involves several factors including the amount of interference in the downlink. The amount of interference in the downlink includes an interference signal and thermal noise generated by antennas belonging to a neighboring base station, and it is important for the terminal to determine the channel condition in the downlink. For example, when a base station having one transmit antenna transmits a signal a terminal having one receive antenna, by using a reference signal received from the base station, the terminal determines the energy per symbol receivable in the downlink and the amount of interference to be received simultaneously in the interval where the corresponding symbol is received, and calculates the value of Es/Io (energy per symbol to interference density ratio). The determined value of Es/Io is converted into a value indicating the data transmission rate or a corresponding value, and is notified to the base station in the form of a channel quality indicator (CQI), enabling the base station to determine an appropriate data transmission rate for the terminal in the downlink.

In the LTE-A system, the terminal feeds back information on the downlink channel state to the base station, so that the base station may utilize the feedback information for downlink scheduling. That is, the terminal measures a downlink reference signal sent by the base station and feeds back information extracted from the measurement to the base station according to a rule specified in the LTE/LTE-A standard. In LTE/LTE-A, the terminal generally feeds back the following three pieces of information.

1. Rank Indicator (RI): number of spatial layers available to the terminal in the current channel condition
2. Precoder Matrix Indicator (PMI): index to the precoding matrix preferred by the terminal in the current channel condition
3. Channel Quality Indicator (CQI): maximum data rate available to the terminal in the current channel condition. The CQI may be replaced with a parameter similar to the maximum data rate, such as SINR, maximum error correction coding rate associated with the modulation scheme, or data efficiency per frequency.

The RI, PMI and CQI are associated with each other in meaning. For example, the precoding matrixes supported in LTE/LTE-A are defined differently for different ranks. Hence, the interpretation of the same PMI value when the RI is set to 1 is different from that when the RI is set to 2. In addition, when determining the CQI, the terminal assumes that the PMI and RI values having been reported to the base station are applied at the base station. For example, if the terminal has reported RI_X, PMI_Y and CQI_Z to the base station, this means that the terminal is capable of receiving data at a data rate corresponding to CQI_Z on the assumption of rank RI_X and precoding PMI_Y. In this way, the terminal may assume a transmission mode to be used by the base station to calculate the CQI, so that optimal performance can be obtained when actual transmission is performed according to the assumed transmission mode.

Figure 3:
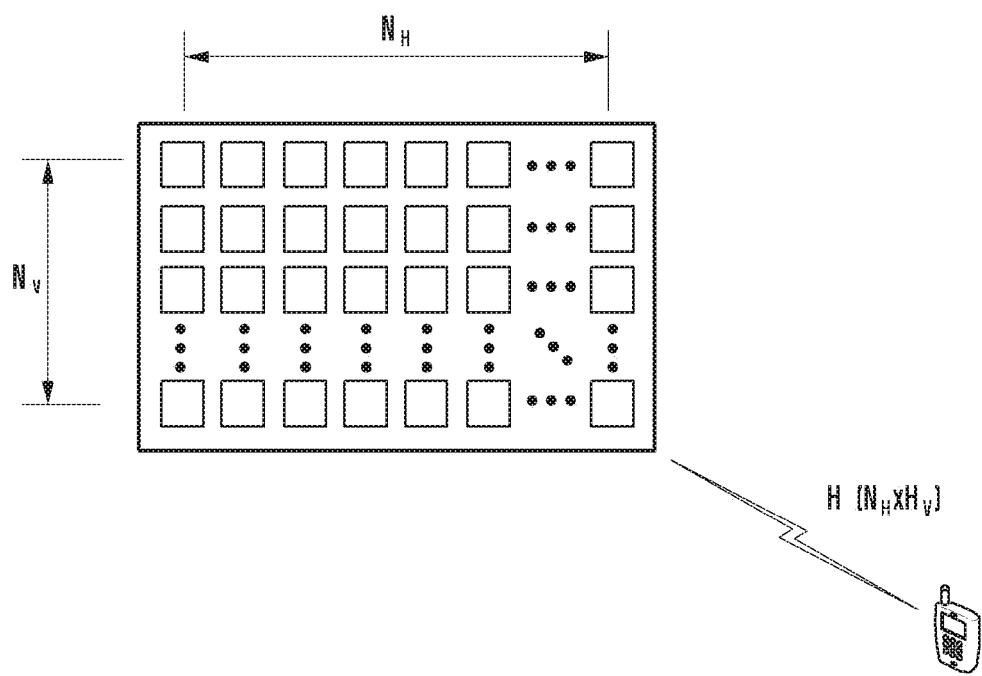
FIG. 3 depicts a communication system to which the present invention is applied.

For channel information generation and reporting, the base station having a large number of antennas has to configure reference signal resources for measuring channels of eight or more antennas and transmit them to the terminal. As shown in FIG. 2, the available CSI-RS resources can use up to 48 REs, but it is possible to configure up to 8 CSI-RSs per one CSI process at present. Therefore, a new CSI-RS configuration scheme is needed to support the FD-MIMO system that can operate based on eight or more CSI-RS ports. For example, in LTE/LTE-A Release 13, one, two, four, eight, twelve or sixteen CSI-RS ports can be configured for one CSI process. Specifically, for {1, 2, 4, 8} port CSI-RS, the existing mapping rule is used. The 12-port CSI-RS is configured with a combination or aggregation of three 4-port CSI-RS patterns, and the 16-port CSI-RS is configured with a combination of two 8-port CSI-RS patterns. In LTE/LTE-A Release 13, for the 12 or 16-port CSI-RS, CDM-2 or CDM-4 is supported using orthogonal cover codes (OCCs) of length 2 or 4. The description of FIG. 3 is for CSI-RS power boosting based on CDM-2. According to the above description, a power boost of up to 9 dB with respect to the PDSCH is required for full power utilization of the 12 or 16-port CSI-RS based on CDM-2. This means that higher performance hardware is needed for full power utilization when operating the 12 or 16-port CSI-RS based on CDM-2. Considering this fact, release 13 has introduced the 12 or 16-port CSI-RS based on CDM-4. Thereby, full power utilization becomes possible with the same 6 dB power boost as before.

FIG. 3 depicts a communication system to which the present invention is applied.

With reference to FIG. 3, the transmission equipment of the base station transmit radio signals by using dozens or more transmit antennas. The plurality of transmit antennas are arranged so as to maintain a given space therebetween as shown in FIG. 3. The given space may correspond to, for example, a multiple of half the wavelength of a transmitted radio signal. Generally, when a space of half the wavelength of a radio signal is maintained between transmit antennas, signals transmitted from the individual transmit antennas are influenced by radio channels having low correlation with each other. As the space between the transmit antennas increases, the correlation between the signals decreases.

In the base station equipment having a large number of antennas, the antennas can be arranged two-dimensionally as shown in FIG. 3 to prevent the equipment from becoming too large. In this case, the base station transmits a signal by using $N_H$ antennas arranged on the horizontal axis and $N_V$ antennas arranged on the vertical axis, and the terminal has to measure the channel for the corresponding antenna.

In FIG. 3, the dozens or more transmit antennas installed in the transmission equipment of the base station are utilized to transmit signals to one or more terminals. Appropriate precoding is applied to a plurality of transmit antennas to simultaneously transmit signals to a plurality of terminals. Here, one terminal may receive one or more information streams. In general, the number of information streams that one terminal can receive is determined according to the number of receive antennas of the terminal and the channel condition.

To effectively implement the MIMO system, as described above, the terminal must accurately measure channel conditions and interference magnitudes and transmit effective channel state information to the base station based on the measurement data. Upon receiving the channel state information, the base station determines a terminal to which data is to be transmitted, a data transmission rate, precoding to be applied, and the like with respect to downlink transmission. In case of the FD-MIMO system, the number of transmit antennas is large. Hence, when the existing scheme of the LTE/LTE-A system is applied to transmit and receive channel state information, an uplink overhead problem may occur that requires transmission of a lot of control information in the uplink.

In a mobile communication system, time, frequency, and power resources are limited. If more resources are allocated to the reference signal, the resources that can be allocated to the transmission of the traffic channel (data) are reduced and the amount of data actually transmitted can be reduced. In such a case, although performance of channel measurement and estimation may be improved, the amount of actually transmitted data is reduced, so that the overall system capacity performance may be lowered.

Therefore, a proper distribution is required between the resources for the reference signal and the resources for the traffic channel transmission to achieve optimum performance in terms of the overall system capacity.

The base station having a large number of antennas as shown in FIG. 3 has to configure reference signal resources for measuring channels of eight or more antennas and transmit them to the terminal. The available resources can use up to 40 REs in FIG. 2, but in fact only 2, 4, and 8 resources are available to one cell. Hence, to support channel measurement for a large number of antennas required in the FD-MIMO system, it is necessary to provide CSI-RS patterns for 16 or 32 resources, which are not supported by the current system. For accurate and efficient CSI generation, these patterns should be designed in consideration of various aspects such as power boosting and radio channel estimator implementation.

Additionally, in a base station using conventional four horizontal dimension antennas, when vertical dimension antennas are used to improve performance, the applicable size of antennas may not be four or eight. Hence, it is necessary to newly design CSI-RS patterns for supporting 12 antennas and various other numbers of antennas with three vertical antennas.

Table 1 below shows RRC fields constituting the CSI-RS configuration.

The settings for reporting the channel state based on the periodic CSI-RS in the CSI process can be classified into four types as shown in Table 1. CSI-RS config is for setting the frequency and time position of a CSI-RS RE. Here, the number-of-antennas setting indicates how many ports the corresponding CSI-RS has. Resource config specifies the position of an RE in the RB, and Subframe config sets the period and offset of the subframe. Tables 2 and 3 are for Resource config and Subframe config currently supported by LTE.

TABLE 2

| CSI Reference signal configuration | | Number of CSI reference signals configured | | | | |
|---|---|---|---|---|---|---|
| | | 1 or 2 | | 4 | | 8 |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 1

| CSI-RS config | CSI-IM config | CQI report config | Etc |
|---|---|---|---|
| No. antenna ports | Resource config | Periodic | $P_c$ |
| Resource config | Time and frequency position in a subframe | Mode, resource, periodicity, offset., | Codebook subset restriction |
| Time and frequency position in a subframe | Subframe config | Aperiodic | |
| Subframe config | Periodicity and subframe offset | Mode . . . | |
| Periodicity and subframe offset | | PMI/RI report | |
| Qcl-CRS-info (QCL Type B) | | RI reference CSI process | |
| CRS information for CoMP | | SubframePattern | |

Resource Config

TABLE 3

| CSI-RS Subframe config $I_{CSI-RS}$ | CSI-RS periodicity $T_{CSI-RS}$ (subframes) | CSI-RS subframe offset $\Delta_{CSI-RS}$ (subframes) |
| --- | --- | --- |
| 0-4 | 5 | $I_{CSI-RS}$ |
| 5-14 | 10 | $I_{CSI-RS}$-5 |
| 15-34 | 20 | $I_{CSI-RS}$-15 |
| 35-74 | 40 | $I_{CSI-RS}$-35 |
| 75-154 | 80 | $I_{CSI-RS}$-75 |

Subframe Config

The terminal can identify the frequency and time position, period and offset from Tables 2 and 3 above. Qcl-CRS-info sets quasi co-location information for CoMP. CSI-IM config is for setting the frequency and time position of the CSI-IM for measuring interference. As the CSI-IM is always set on a basis of four ports, it is not necessary to set the number of antenna ports, and Resource config and Subframe config are set in the same manner as the CSI-RS. CQI report config is to specify how to report the channel state via the corresponding CSI process. CQI report config may include settings regarding periodic channel status reporting, aperiodic channel status reporting, PMI/RI reporting, RI reference CSI process, and subframe patterns. In addition, there are a value of $P_C$ indicating the power ratio between the PDSCH and the CSI-RS RE required for the terminal to generate a channel status report, and Codebook subset restriction indicating the codebook to be used.

In the case of an FD-MIMO base station, as described above, a reference signal resource for measuring eight or more antenna channels must be configured and transmitted to the terminal Here, the number of reference signals may be determined according to the base station antenna configuration and measurement type. For example, in LTE/LTE-A Release 13, it is possible to configure {1, 2, 4, 8, 12, 16}-port CSI-RS on the assumption of full port mapping. Here, full port mapping means that all transceiver units (TXRU) have a dedicated CSI-RS port for channel estimation.

Meanwhile, as described above, there is a high possibility that 16 or more TXRUs will be introduced after LTE/LTE-A Release 14. Also, the number of available antenna array geometries will increase significantly compared with Release 13. This means that LTE/LTE-A Release 14 should support a variable number of TXRUs. Table 4 shows available two-dimensional antenna array geometries according to the number of CSI-RS ports under full port mapping. In Table 4, {18, 20, 22, 24, 26, 28, 30, 32}-port CSI-RSs are considered. Considering that two different polarized antennas may exist at the same position in a polarized antenna configuration, {9, 10, 11, 12, 13, 14, 15, 16} different AP positions can be considered. The geometry of a two-dimensional rectangular or square antenna array can be represented by the number $N_1$ of different AP positions in the first dimension (vertical or horizontal) and the number $N_2$ of different AP positions in the second dimension (horizontal or vertical), and possible combinations of the two port numbers are shown by ($N_1$, $N_2$) in Table 4. Table 4 shows that various antenna array geometries may exist depending on the number of CSI-RS ports.

TABLE 4

| Number of aggregated CSI-RS ports | Number of aggregated CSI-RS ports per polarization | Available 2D antenna array geometry, ($N_1$, $N_2$) (1D configurations were omitted) | Impact on 2D RS and feedback design |
| --- | --- | --- | --- |
| 18 | 9  | (3, 3) — — — | Low |
| 20 | 10 | (2, 5) (5, 2) — — | Med |
| 22 | 11 | — — — — | — |
| 24 | 12 | (2, 6) (3.4) (4, 3) (6, 2) | High |
| 26 | 13 | — — — — | — |
| 28 | 14 | (2, 7) (7, 2) — — | Med |
| 30 | 15 | (3, 5) (5, 3) — — | Med |
| 32 | 16 | (2, 8) (4, 4) (8, 2) — | High |

Available 2D antenna array geometry according to the number of aggregated CSI-RS ports based on full port mapping In order to support 16 or more CSI-RS ports as described above, it is necessary to consider the following issues.

1. CSI-RS configurations with a large number of ports suitable for various 2-dimensional antenna array geometries including cross polarization and various channel conditions 2. Reduction of CSI-RS resource overhead due to a large number of CSI-RS ports First Embodiment There are two options for defining CSI-RS resources in one RB for aperiodic CSI-RS transmission.

1. Option 1 for defining time/frequency resources required for aperiodic CSI-RS transmission: transmission using existing CSI-RS REs.

2. Option 2 for defining time/frequency resources required for aperiodic CSI-RS: defining new resources for CSI-RS transmission.

Option 1 is to transmit the aperiodic CSI-RS through existing resources for 1, 2, 4, 8-port CSI-RS transmission shown in FIG. 2. The advantage of this option is that it can transmit the PDSCH for data transmission together with a new aperiodic CSI-RS to conventional and new terminals. However, in this option, when the base station allocates and transmits aperiodic CSI-RS resources to a specific terminal, other terminals receiving data must be allocated the corresponding resources as a ZP CSI-RS.

Option 2 is to define new resources for CSI-RS transmission only.

Figure 4:
FIG. 4 illustrates subframes and RBs for CSI-RS transmission proposed in the present invention.
Figure 4:
Figure 4:
Figure 4:
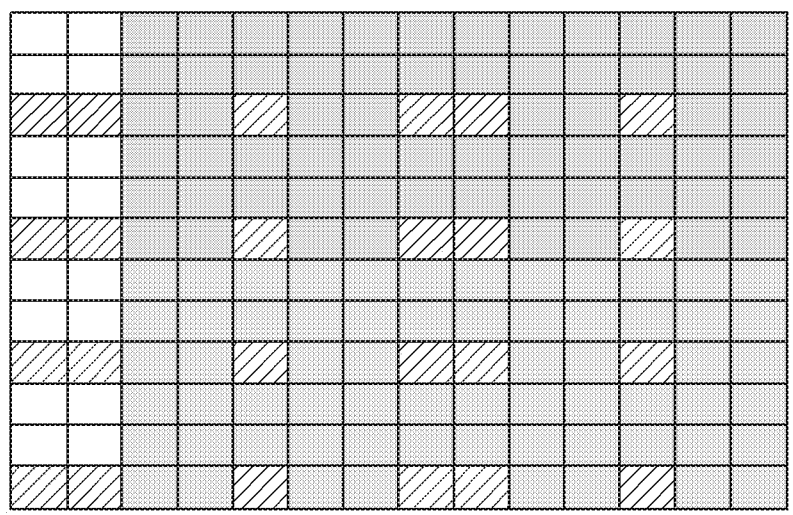

FIG. 4 shows an example of a new resource region for CSI-RS transmission only.

With reference to FIG. 4, the full band, subband or RB corresponding to a particular subframe is used only for CSI-RS transmission. Here, the DMRS for PDSCH decoding need not be transmitted. Hence, the full band except for the PDCCH transmission region and the CRS transmission region can be used as CSI-RS REs. In the case where the subframe in which the aperiodic CSI-RS transmission is configured is the MBSFN subframe, as the CRS is transmitted only via the symbol where the PDCCH is to be transmitted, the number of CSI-RS REs can be further increased. In the case of the special subframe, the subframe excluding the guard period (GP) and the uplink transmission interval (UpPTS) can be used. For example, assuming two PDCCH symbol transmission and MBSFN subframe, 144 REs can be used for CSI-RS transmission. In this option, it is possible to secure a large number of CSI-RS REs in one RB, thereby enabling simultaneous transmissions to multiple terminals. Further, as the PDSCH is not transmitted, there is no need to separately configure the ZP CSI-RS for aperiodic CSI-RS transmission. This advantage helps the terminal to use the aperiodic CSI-RS regardless of positions. In addition, when the terminal using option 1 for time/frequency resource definition is dynamically allocated an aperiodic CSI-RS in a specific subframe (full-band), subband or RB, if the corresponding subframe transmits a signal for synchronization (PSS/SSS), transmits SIB1 (SystemInformationBlockType1) information containing system information, or is a paging subframe, it can be assumed that all or some of the scheduled information is not transmitted in the region where the aperiodic CSI-RS is allocated.

Second Embodiment

The following options are possible for setting the unit for transmitting aperiodic CSI-RS resources described in the first embodiment.

1. Option 1 for defining the unit for aperiodic CSI-RS resource transmission: allocation and transmission based on the full band
2. Option 2 for defining the unit for aperiodic CSI-RS resource transmission: allocation and transmission based on specific subband
3. Option 3 for defining the unit for aperiodic CSI-RS resource transmission: allocation and transmission based on specific bandwidth part
4. Option 4 for defining the unit for aperiodic CSI-RS resource transmission: allocation and transmission based on specific RGB
5. Option 5 for defining the unit for aperiodic CSI-RS resource transmission: allocation and transmission based on specific non-contiguous RBs
6. Option 6 for defining the unit for aperiodic CSI-RS resource transmission: allocation and transmission based on specific contiguous RBs Option 1 for defining the transmission unit is to allocate and transmit the aperiodic CSI-RS over the full band. In this option, as the CSI-RS is always transmitted in the full band like the existing periodic CSI-RS, it is not necessary to dynamically transmit additional information except for the indication of aperiodic CSI-RS transmission. Because the CSI-RS is always measured in the full band and the channel status information is generated as in the conventional terminal operation, the operation of the terminal is very similar to the conventional one. However, as the aperiodic CSI-RS must always be allocated and transmitted in the full band, this option is disadvantageous in terms of efficiency in CSI-RS allocation and transmission.

Option 2 for defining the transmission unit is to allocate and transmit the aperiodic CSI-RS in a specific subband. In channel status reporting, the size of the subband depends on the system bandwidth supported by the system. Table 5 shows the subband sizes according to the system bandwidth settings.

TABLE 5

| System Bandwidth $N_{RB}^{DL}$ | subband Size (k) |
| --- | --- |
| 6-7 | NA |
| 8-10 | 4 |
| 11-26 | 4 |
| 27-63 | 6 |
| 64-110 | 8 |

Subband Size (k) Vs. System Bandwidth

The number of subbands varies depending on the system bandwidth settings. For example, in the case of 50 RBs, according to the above table, 6 RBs are set as one subband, so that there are 9 subbands. For this setting, a 9-bit field can be used as a bitmap. In this option, as the estimation range of the terminal is smaller than that of the full band, it is possible to reduce the channel estimation complexity of the terminal. The estimation range is the same as the existing unit for subband channel estimation, so that the terminal can use the existing hardware as it is. In addition, CSI-RS resources can be flexibly used for each subband. However, RRC or L1 signaling may be required.

Option 3 for defining the transmission unit is to allocate the aperiodic CSI-RS in a specific bandwidth part. Table 6 shows the bandwidth parts used in existing periodic channel status reporting.

TABLE 6

| System Bandwidth $N_{RB}^{DL}$ | subband Size k (RBs) | Bandwidth Parts (J) |
| --- | --- | --- |
| 6-7 | NA | NA |
| 8-10 | 4 | 1 |
| 11-26 | 4 | 2 |
| 27-63 | 6 | 3 |
| 64-110 | 8 | 4 |

Subband Size (k) and Bandwidth Parts (J) Vs. System Bandwidth

Figure 5:
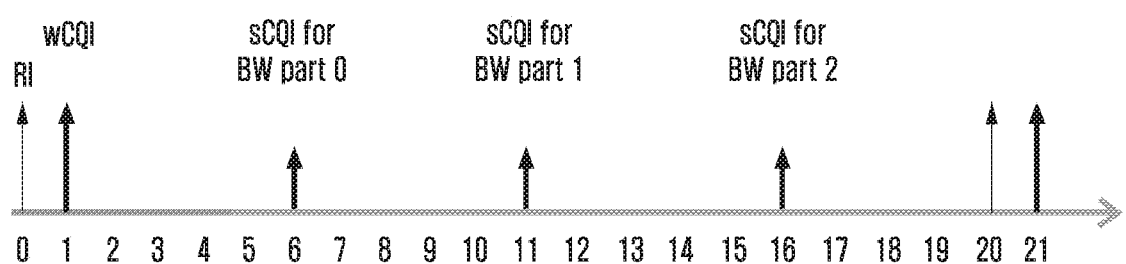
FIG. 5 depicts operations of the terminal to periodically report the channel state using a bandwidth part in the LTE system.

FIG. 5 depicts operations of the terminal to periodically report the channel state using a bandwidth part.

In FIG. 5, the terminal divides the entire subbands into J bandwidth parts according to the system bandwidth as shown in the above table, reports the preferred subband position for each bandwidth part, and reports the PMI and the CQI corresponding to the preferred subband to the base station. Allocating the aperiodic CSI-RS based on the bandwidth part requires a smaller degree of freedom than the increased degree of freedom due to subband support. Hence, aperiodic CSI-RS transmission can be performed in a partial band other than the full band with a small amount of configuration information. When option 2 for defining the transmission unit is utilized, the terminal can select a specific subband within a bandwidth part and report the channel state only in the selected subband in the same manner as existing periodic channel status reporting. This can reduce the amount of uplink data transmission required by the terminal for aperiodic channel status reporting.

Option 4 for defining the transmission unit is to allocate and transmit the aperiodic CSI-RS in a specific RBG. In channel status reporting, the RGB size depends on the system bandwidth supported by the system. Table 7 shows the subband sizes according to the system bandwidth settings.

TABLE 7

| Bandwidth (#RBs) | RBG size (P) |
| --- | --- |
| ≤10 | 1 |
| 11-26 | 2 |
| 27-63 | 3 |
| 64-110 | 4 |

RBG Size (P) Vs. System Bandwidth

The size of the RBG varies depending on the system bandwidth settings. For example, in the case of 50 RBs, according to the above table, 3 RBs are set as one RBG, so that 18 subbands exist. For this setting, an 18 bit field can be used as a bitmap. In this case, as the estimation range of the terminal is smaller than the full band, the channel estimation complexity of the terminal can be reduced. In addition, the CSI-RS resources can be flexibly used in units of RBGs smaller than subbands, and existing downlink resource allocation type 0 can be reused.

Figure 6:
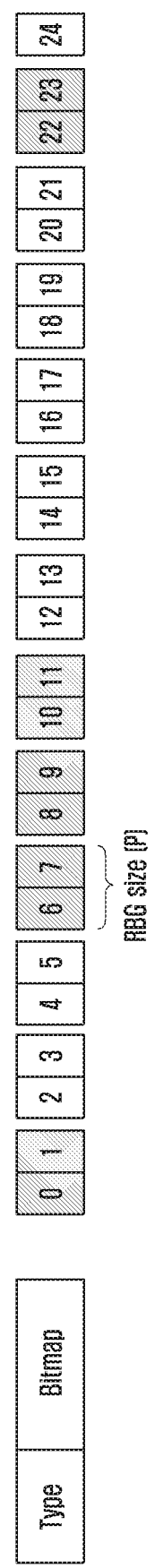
FIG. 6 depicts resource allocation for PDSCH transmission through downlink resource allocation type 0 in the LTE system.

FIG. 6 depicts downlink resource allocation type 0.

As shown in FIG. 6, in resource allocation type 0, resources are allocated in units of RBGs determined according to the system bandwidth. For resource allocation based on type 0, the base station uses bits to notify the resource allocation type. For actual resource allocation, the RBG size corresponding to the system bandwidth size in Table 6 is used. The terminal can be allocated an RBG of a corresponding size using a bitmap of size $\lceil N_{RB}^{DL}/P \rceil$ and can receive the downlink data via the corresponding resource. Likewise, to notify the terminal of whether the aperiodic CSI-RS is to be transmitted in a specific RBG, the base station can allocate the aperiodic CSI-RS for each RBG according to the corresponding option. However, RRC or L1 signaling may also be required.

Option 5 for defining the transmission unit is to allocate and transmit the aperiodic CSI-RS via specific non-contiguous RBs. This option supports aperiodic CSI-RS transmission for each non-contiguous RB, thereby increasing the flexibility of resource usage. However, this option may increase the signaling overhead for delivery. Here, downlink resource allocation type 1 may be reused for option 5 for defining the transmission unit.

Figure 7:
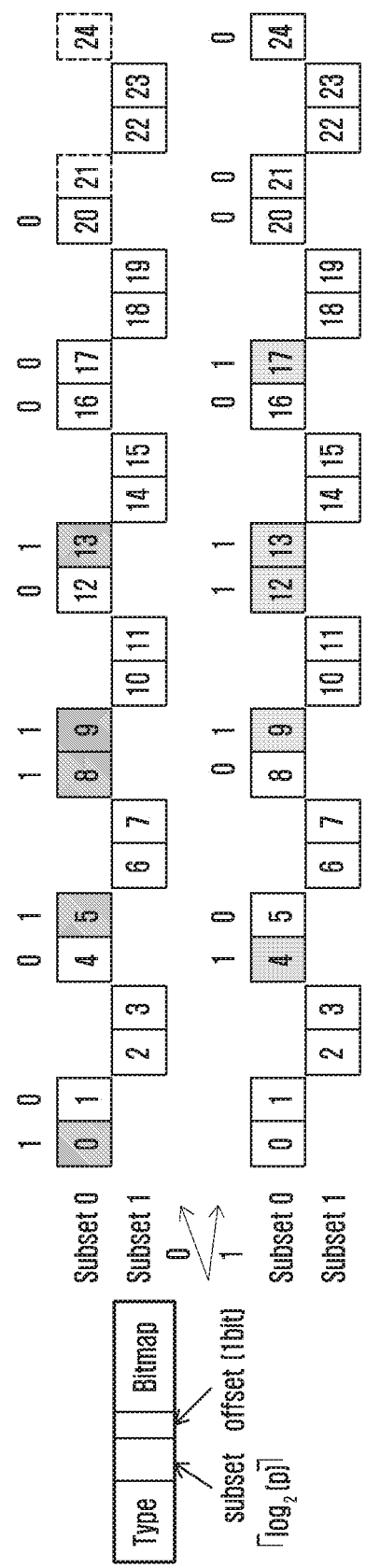
FIG. 7 depicts resource allocation for PDSCH transmission through downlink resource allocation type 1 in the LTE system.

FIG. 7 depicts downlink resource allocation type 1.

As shown in FIG. 7, for resource allocation based on type 1, the base station uses bits to notify the resource allocation type. As the signaling overhead excessively increases when resources are allocated for each RB at one time for the full band, the resources can be divided into two parts by the offset for transmission. Type 1 uses the same amount of signaling as type 0. To this end, the terminal may be allocated corresponding RBs using a bitmap of size ($\lceil N_{RB}^{DL}/P \rceil - \lceil \log_2(P) \rceil - 1$), which is a value obtained by subtracting $\lceil \log_2(P) \rceil$ bits for selecting the subset and 1 bit for selecting the offset from the bitmap size $\lceil N_{RB}^{DL}/P \rceil$ for type 1, and may receive the downlink data via the corresponding resource. By reusing the method of downlink resource allocation type 1, the base station can transmit the aperiodic CSI-RS to the terminal Here, the method may be RRC or L1 signaling. In addition, unlike downlink data allocation, aperiodic CSI-RS transmission through non-contiguous RB allocation has no unnecessary overhead for CSI-RS transmission such as MCS for each codeword, more DCI bits can be configured compared with downlink data resource allocation. In this case, it is also possible to use a full-size bitmap except for the offset.

Option 6 for defining the transmission unit is to allocate and transmit the aperiodic CSI-RS via specific contiguous RBs. In this option, unlike transmitting the aperiodic CSI-RS via non-contiguous RBs, signaling overhead is reduced compared to other allocation methods because only the start RB position and its length or the end RB position are notified. However, the aperiodic CSI-RS is always transmitted via contiguous RBs only. Hence, when it is determined that the efficiency of the terminal is high in a noncontiguous RB or subband, only a specific location is selected or the aperiodic CSI-RS is transmitted via an unnecessarily large number of bands. In this case, downlink resource allocation type 2 may be reused for option 6 for defining the transmission unit.

Figure 8:
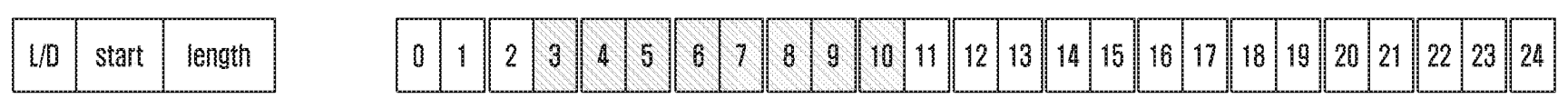

FIG. 8 depicts downlink resource allocation type 2.

As shown in FIG. 8, to allocate resources based on type 2, the base station uses 1 bit to indicate whether resources are allocated in the form of a localized virtual resource block (LVRB) or a distributed virtual resource block (DVRB). Based on this, the start RB position and the length are notified through the resource indication value (RIV). Here, the start position and the length can be obtained according to the DCI format as shown in Equation 1.

For DCI format 1A, 1B and 1D,  Equation 1

$$RIV = \begin{cases} N_{RB}^{DL}(L_{CRBs} - 1) + RB_{start} & (L_{CRBs} - 1) \leq \lfloor N_{RB}^{DL}/2 \rfloor \\ N_{RB}^{DL}(N_{RB}^{DL} - L_{CRBs} + 1) + \\ (N_{RB}^{DL} - 1 - RB_{start}) & \text{otherwise} \end{cases}$$

For DCI format 1C, $$RIV = \begin{cases} N_{VRB}^{\prime DL}(L_{CRBs}^{\prime} - 1) + RB_{start}^{\prime} & (L_{CRBs}^{\prime} - 1) \leq \lfloor N_{VRB}^{\prime DL}/2 \rfloor \\ N_{VRB}^{\prime DL}(N_{VRB}^{\prime DL} - L_{CRBs}^{\prime} + 1) + \\ (N_{VRB}^{\prime DL} - 1 - RB_{start}^{\prime}) & \text{otherwise} \end{cases}$$

where $RB_{start}^{\prime} = RB_{start} / N_{RB}^{step}$ $L_{CRBs}^{\prime} = L_{CRBs} / N_{RB}^{step}$ $N_{VRB}^{\prime DL} = \lfloor N_{VRB}^{DL} / N_{RB}^{step} \rfloor$ Here, $\lceil \log_2(N_{RB}^{DL}(N_{RB}^{DL}+1)/2) \rceil$ bits and $\lceil \log_2(\lfloor N_{VRB,gap1}^{DL}/N_{RB}^{step} \rfloor \cdot (\lfloor N_{VRB,gap1}^{DL}/N_{RB}^{step} \rfloor + 1)/2) \rceil$ bits are used for resource allocation.

Although only downlink resource allocation is described in the embodiment of the present invention, the above-mentioned signaling can also be applied to uplink resource allocation based on the same principle. In addition, although the resource allocation information in the current LTE/LTE-A system is transmitted through the DCI being L1, the above method can be applied to the configuration through RRC signaling as well.

Third Embodiment

In option 2 for defining time/frequency resources required for aperiodic CSI-RS transmission described in the first embodiment, as described before, the PDSCH is not transmitted to the terminal in a subframe scheduled for aperiodic CSI-RS transmission. Hence, the resources required for PDSCH transmission and the resources required for DMRS transmission for PDSCH decoding can be used for the CSI-RS. Here, the base station notifies the OFDM symbols needed for PDCCH transmission via the PCFICH, and the corresponding resource cannot be used in the subframe or RB necessary for aperiodic CSI-RS transmission because the PDCCH is to be transmitted. In addition, the CRS cannot be used for aperiodic CSI-RS transmission because it is commonly used by all terminals of the base station for PDSCH decoding, synchronization with the base station, and RRM. However, in LTE Release 12, subframes except for FDD subframe 0, 4, 5 or 9 and TDD subframe 0, 1, 5 or 6 may be configured as a multicast-broadcast single-frequency network (MBSFN) subframe by using the RRC configuration. In the corresponding subframe, the CRS is not transmitted in the PDSCH region except for the PDCCH region, and thus the CSI-RS region can be increased.

As described above, the CSI-RS resources available in one RB or subframe proposed in the present invention may be changed according to PCFICH transmission, MBSFN configuration, and the subframe index. In existing periodic CSI-RS transmission using 1, 2, 4 or 8 ports, as resources usable for CSI-RS transmission are always fixed, the transmission is possible by defining one port index for each antenna. As periodic CSI-RS transmission using 12 or 16 ports is also based on existing resources, the transmission is possible by combining existing 4-port or 8-port CSI-RSs. However, in the case of the method proposed in the present invention, as the resources that can be transmitted are changed, it cannot be supported by the existing fixed port definition. Hence, a new rule is required for mapping between resources and ports.

Figure 9:
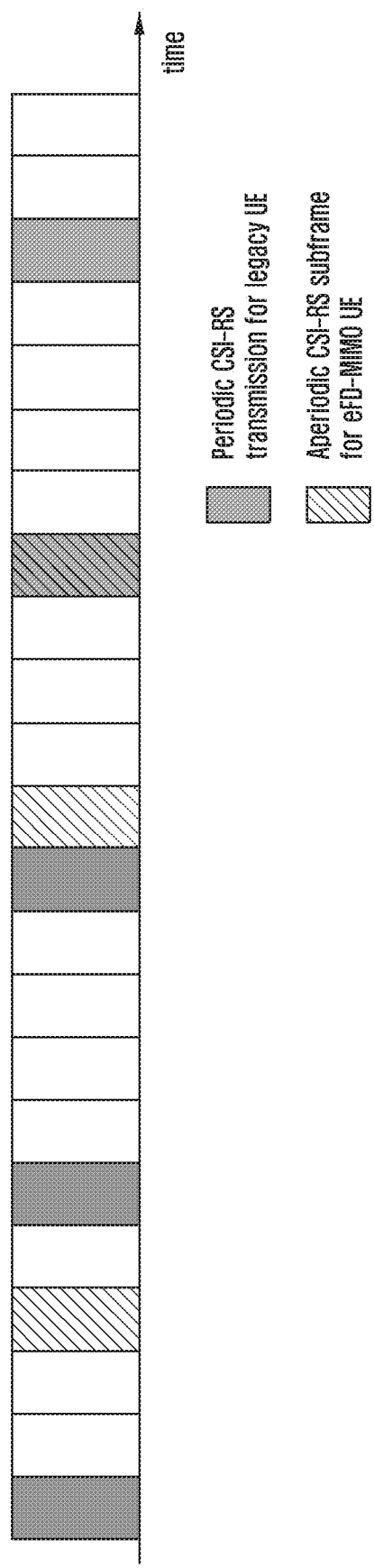
FIG. 9 depicts a situation where the aperiodic CSI-RS RB or subframe proposed in the present invention operates together with the existing periodic CSI-RS.

FIG. 9 depicts a situation where the aperiodic CSI-RS RB or subframe proposed in the present invention is transmitted.

In FIG. 9, the base station configures terminals with the periodic CSI-RS. As the existing LTE terminal does not support the aperiodic CSI-RS, a periodic CSI-RS should be transmitted to the LTE terminal for reporting channel state information. Even a terminal supporting new aperiodic CSI-RS transmission can report coarse channel state information by allocating a small number of CSI-RS ports using virtualization or beamforming. The base station can determine whether a terminal requires aperiodic CSI-RS transmission, and allocate an aperiodic CSI-RS to the terminal requiring aperiodic CSI-RS transmission. Hence, as shown in FIG. 9, the periodic CSI-RS and the aperiodic CSI-RS may be transmitted in different subframes, but may be transmitted in the same subframe according to the channel state of the terminal.

In this embodiment, the base station and the terminal identify the REs available for the aperiodic CSI-RS in the corresponding RB. Here, CSI-RS REs can be secured by excluding all or some REs for the PDCCH, CRS, PCFICH, PHICH, PSS, SSS and paging. As the PDSCH is not transmitted in the corresponding RB, the DMRS need not be transmitted. Therefore, in option 1 for defining port indexes proposed in the present invention, the ports are indexed after securing the available REs. The base station should transmit the terminal the k-th frequency RE and the position of the l-th time symbol from which the CSI-RS port starts. The starting frequency and the time symbol position can be indicated by a pair (k,l) with respect to the whole RB. For example, in one RB, the 0-th subcarrier and the 4-th time symbol may be represented by (0,4), and the 6-th subcarrier and 7-th symbol may be represented by (6,7). Here, in setting the time and frequency position, it is equally effective to notify the time symbol first and notify the frequency position later. Also, it is possible to indicate (k, l) pairs with respect to the slot other than one RB. For example, (0,4) may be represented by (0,4) ns=0, and (6, 7) may be represented by (6,0) ns=1. In addition, the above two methods may be represented by using one parameter. For example, index 0 can represent (0,0), and index 1 can represent (1,0). This can also be represented by an equation indicating the relationship between the parameter and (k,l). Equation 2 represents such a relationship.

With respect to the RB, $k = \mathrm{mod}(I,12), l = \lfloor I/14 \rfloor$

With respect to the slot, $n_s = \lfloor I/64 \rfloor, k = \mathrm{mod}(I,12), l = \lfloor \mathrm{mod}(I,64)/7 \rfloor$   Equation 2

The CSI-RS port index start resource proposed in the present invention can be specified as follows.

1. Option 1 for specifying the start CSI-RS resource: use the DCI
2. Option 2 for specifying the start CSI-RS resource: specify the available resource via RRC
3. Option 3 for specifying the start CSI-RS resource: specify the available resource separately for normal and MBSFN subframes via RRC Option 1 for specifying the start resource is a scheme using the DCI. The base station notifies the terminal of the index of the corresponding resource position, and the terminal receives the index and identifies the resource based on the number of antenna ports. However, as there are many possible positions that can be set as the start position, the overhead can be large (168 bits are required when all REs are available). If the CSI-RS allocation unit is a slot or a smaller unit other than the RB, as the number of bits can be reduced, the use of this option can be considered. In this case, the aperiodic start resource configuration is delivered via the DCI, but the configuration about the number of CSI-RS antenna ports required for the terminal, subsampling, the number of antenna ports after subsampling, $P_C$ value, codebook subset restriction, and the like can be set through RRC.

Option 2 for specifying the start resource is a scheme using RRC. The base station notifies the corresponding resource position in advance via RRC, and the terminal can identify the resource together with the number of antenna ports. These fields may be named as ResourceConfig-r14 using fields similar to existing periodic CSI-RS resources. However, as the terminal can receive the aperiodic CSI-RS only at a preset position, the CSI-RS resource efficiency can be relatively lowered. In this case, it is also possible to increase the degree of freedom of aperiodic CSI-RS transmission by providing multiple candidates for aperiodic CSI-RS transmission. To this end, the base station may notify the terminal of the candidates being transmitted via the DCI, and the terminal can recognize that the aperiodic CSI-RS is transmitted according to the indicated setting among multiple settings. Tables 8 and 9 illustrate the mapping between the DCI fields and aperiodic CSI-RS configuration.

TABLE 8

| AP-CSI-RS indicator | Notification |
| --- | --- |
| 00 | First aperiodic CSI-RS configuration set by RRC information |
| 01 | Second aperiodic CSI-RS configuration set by RRC information |
| 10 | Third aperiodic CSI-RS configuration set by RRC information |
| 11 | Fourth aperiodic CSI-RS configuration set by RRC information |

Allocation DCI Signaling with Separate Bit for Aperiodic CSI-RS Transmission

TABLE 9

| AP-CSI-RS indicator | Notification |
| --- | --- |
| 00 | No aperiodic CSI-RS transmission |
| 01 | First aperiodic CSI-RS configuration set by RRC information |

TABLE 9-continued

| AP-CSI-RS indicator | Notification |
|---|---|
| 10 | Second aperiodic CSI-RS configuration set by RRC information |
| 11 | Third aperiodic CSI-RS configuration set by RRC information |

Allocation DCI Signaling without Separate Bit for Aperiodic CSI-RS Transmission

Table 8 illustrates allocation DCI signaling when there is a separate bit for aperiodic CSI-RS transmission. The base station uses an additional 1 bit to indicate whether the aperiodic CSI-RS is transmitted. With an additional bit, there is no need to indicate the absence of aperiodic CSI-RS transmission in this signaling, and two bits can be used to indicate one of four aperiodic CSI-RS configurations.

Table 9 illustrates allocation DCI signaling when there is no separate bit for aperiodic CSI-RS transmission. As the base station does not use an additional 1 bit indicating whether the aperiodic CSI-RS is transmitted, the corresponding field must also be included in the indication, and two bits can be used to indicate up to three aperiodic CSI-RS configurations.

Although the above example is using two bits, the number of indications can be increased by using 3 bits, 4 bits, and so on. In addition to the aperiodic start resource configuration, the number of CSI-RS antenna ports required for the terminal, application of subsampling, the number of antenna ports after subsampling, $P_C$ value, codebook subset restriction, and the like can be set as separate fields through RRC.

However, when an MBSFN subframe is configured, the port mapping and the resource position in the corresponding RB may vary depending on the subframe location, and all possible settings must be provided for each case. Here, if the number of possible settings is small, the degree of freedom decreases; and if there is a large number of possible settings, the DCI overhead for selection increases, which may reduce the efficiency of the aperiodic CSI-RS resource transmission.

Option 3 for specifying the start CSI-RS resource is a method specifying the available resource separately for normal and MBSFN subframes via RRC. This option is basically similar to option 2 for specifying the start resource, but the DCI overhead can be reduced by separately handling the normal subframe and the MBSFN sub-frame. The terminal may check whether the subframe in which the aperiodic CSI-RS is configured is a normal subframe or an MBSFN subframe, and identify the aperiodic CSI-RS configuration among the settings corresponding to the indicated subframe. For example, if four of the eight advance settings are to be used for the MBSFN subframe and four for the normal subframe, 3 DCI bits must always be transmitted in option 2 while 2 DCI bits can be transmitted in option 3. However, option 2 can be freely adjusted regardless of which subframe the 8 settings are used for while option 3 should always divide the settings by four, which may result in restrictions on aperiodic CSI-RS transmission.

The method of defining the port index based on the start resource configuration in the CSI-RS RB or subframe proposed in the present invention can be divided into the following two cases according to the possibility of simultaneous transmission to the legacy terminal.

1. Option 1 for CSI-RS RB or port index definition: the port index is assigned to the corresponding transmittable resource according to frequency and time resources 2. Option 2 for CSI-RS RB or port index definition: the corresponding transmittable resources are divided into legacy CSI-RS resources and new CSI-RS resources and the port index is separately assigned for each resource type according to frequency and time resources FIG. 10 illustrates an example of defining port indexes based on option 1 for port index definition and assigning the port index to the terminal.

Figure 10:
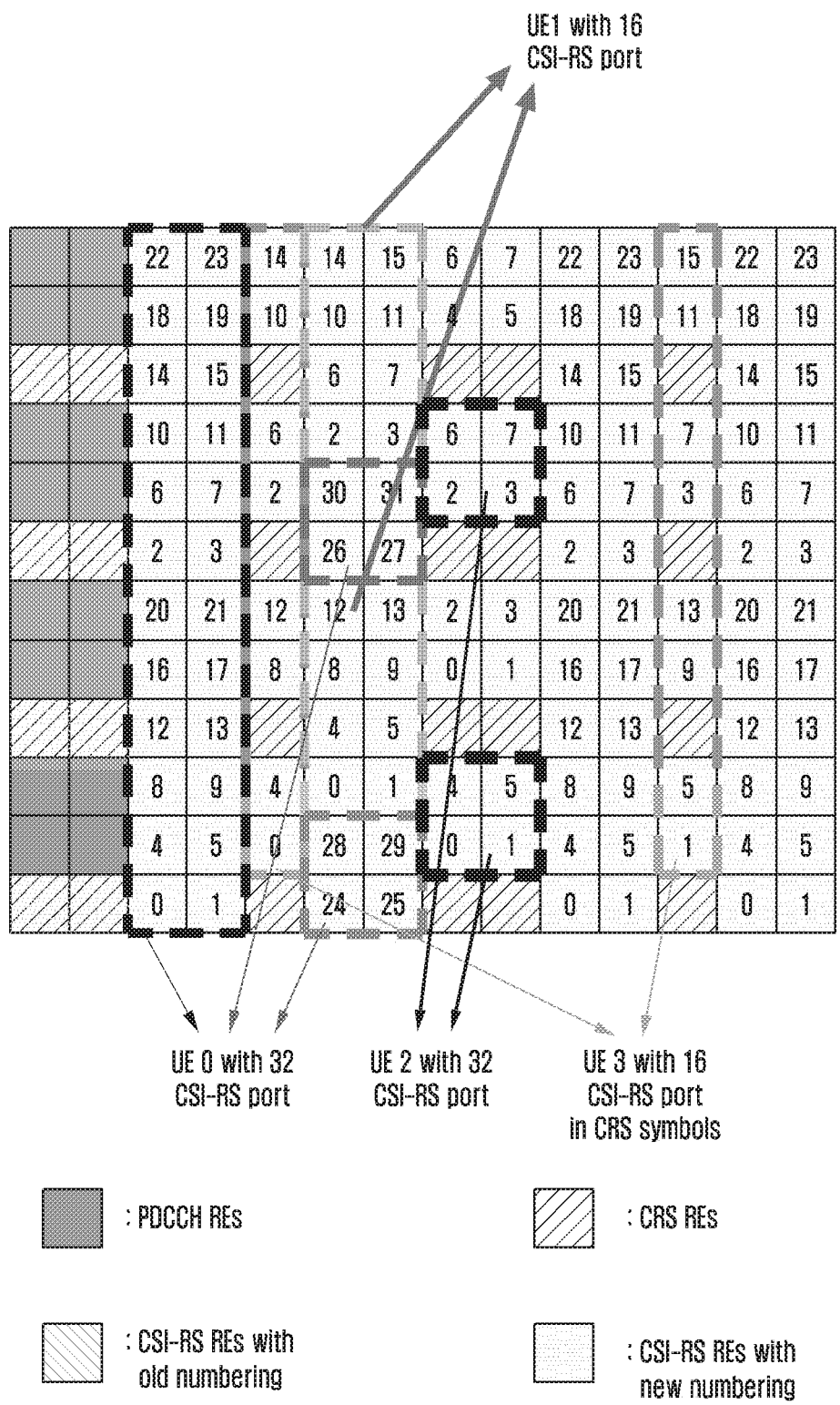
FIG. 10 shows an example in which the aperiodic CSI-RS RB or subframe proposed in the present invention defines port indexes based on all available resources.

With reference to FIG. 10, for the frequency, the frequency resources of the RBs can be divided in half and the ports can be alternately assigned based on the position of the frequency RE and the symbol indicated by the start resource setting method described before. In the case of time symbol, port assignment is performed using two time symbols from the corresponding time symbol for CDM2, and using four time symbols for CDM4. For example, in FIG. 10, the base station configures terminal 0 with 32 antenna ports based on CDM2 for (k,l)=(0,2). Based on this information, the terminal may divide one RB in half by using two time symbols, and may map ports 0 and 1 to k=0, ports 2 and 3 to k=6, ports 4 and 5 to k=1, ports 6 and 7 to k=7, and so on. Here, as there are only 12 frequency resources in one RB, it is not possible to map all the 32 antenna ports to two time symbols. Hence, up to ports 22 and 23 are mapped to the corresponding time symbol, and ports 24 and later are mapped to the next time symbol. Note that the time symbol via which the CRS is transmitted is not used together with the time symbol via which the CRS is not transmitted and only the CRS transmitting symbols are used together. This means that the REs carrying the CRS must consume a lot of power for the CRS, so that the available transmission power can be relatively small compared to the normal REs. The REs carrying the CRS may be different from the normal REs in terms of the power ratio between the CSI-RS and the PDSCH ($P_c$ value). Therefore, it is desirable to collect the REs carrying the CRS and map the port index thereto. The configuration and use of time and frequency resources for the CRS can be described based on terminal 3 in FIG. 10. Terminal 3 is configured with the start position indicated by (k,l)=(1,4) based on CDM2. As the corresponding position is a position where the CRS is transmitted, the terminal groups other CRS symbols and maps the CSI-RS port thereto based on CDM2.

In FIG. 10, terminal 3 uses symbol 4 and symbol 11 via which the CRS is transmitted as a bundle. However, it is also possible to combine nearby CRS symbols. When using nearby symbols as a bundle, the performance can be equalized because the time symbol distance between the two resources is the same within the CSI-RS resources in which the CRS symbol is transmitted. However, as shown in FIG. 10, using the resources that are 7 symbols away may degrade performance compared to using nearby symbols 7 and 8 together. Additionally, in the case of CDM4, all four time symbols carrying the CRS are used as a bundle. This method can be efficiently used when only the aperiodic CSI-RS is allocated to one RB for transmission. However, as shown in FIG. 9, when the existing periodic CSI-RS and the aperiodic CSI-RS need to be allocated and transmitted in an overlapping manner, resource utilization may become inefficient. As described above, CRS symbols and normal symbols may differ in terms of power usage. A plurality of $P_C$ values may be set for the CSI-RS configuration so that different $P_C$ values can be applied depending on the symbol corresponding to the resource. For example, it is possible to use a $P_C$ value corresponding to the CRS symbol when the base station indicates the symbol in which the CRS is transmitted, and use a $P_C$ value corresponding to the normal symbol when the CSI-RS is transmitted via a normal symbol.

Figure 11:
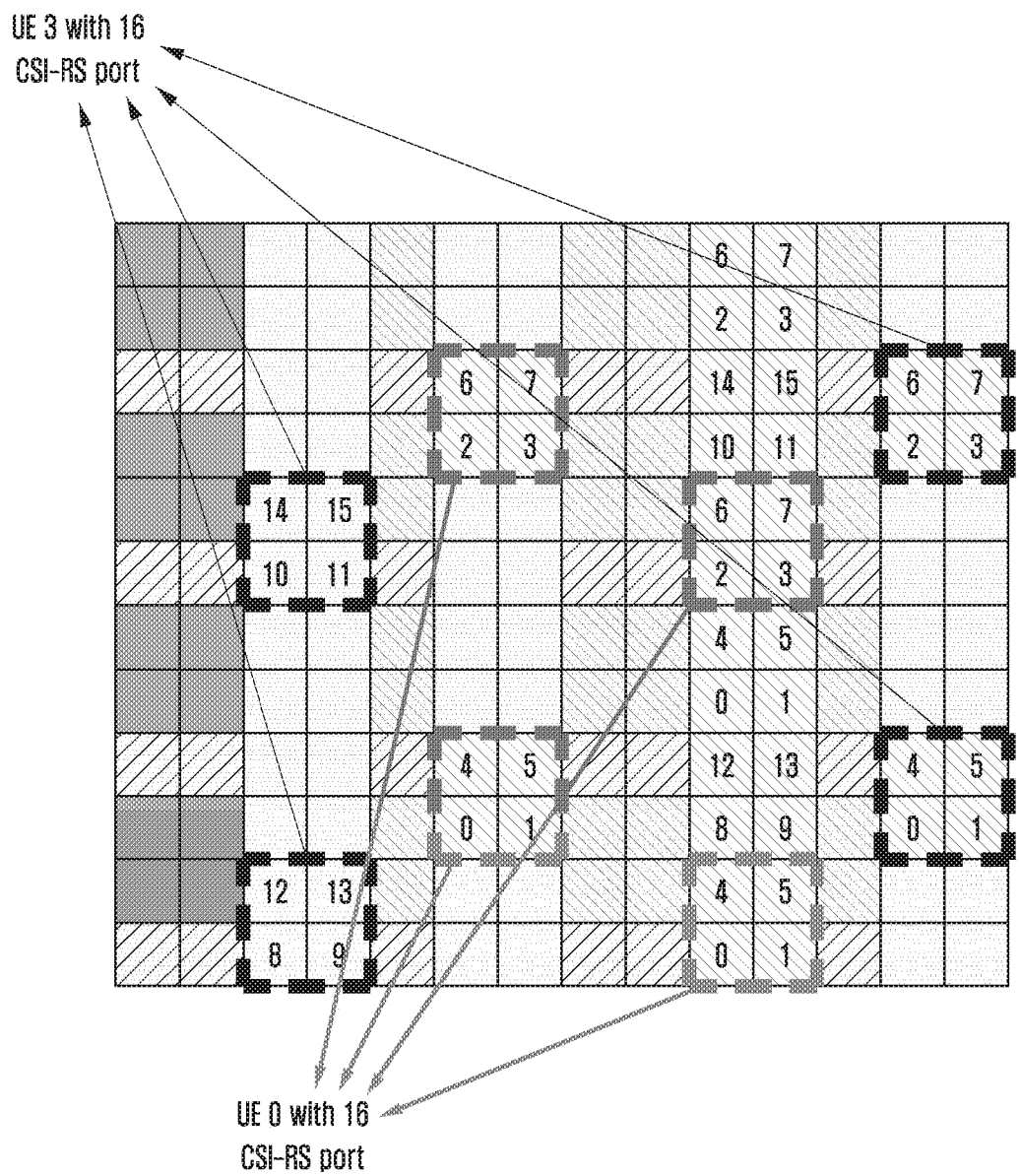
FIG. 11 shows an example in which the aperiodic CSI-RS RB or subframe proposed in the present invention divides all available resources into existing CSI-RS resources and new CSI-RS resources and defines port indexes separately.

FIG. 11 illustrates an example of defining port indexes based on option 2 for port index definition.

The method of FIG. 11 is basically the same as the method of FIG. 10 described above except that the same approach as before is applied to the REs used for the legacy CSI-RS. When the terminal is allocated a legacy CSI-RS RE as the start resource, the port is mapped only to the legacy CSI-RS REs in the same manner as before. For example, in FIG. 11, when terminal 0 is allocated 16 ports, existing CSI-RS RE resources other than the above frequency resources are used after port 4/5 and port 6/7 are allocated. Although this method is somewhat complicated in port indexing, it can also be used for transmission to the legacy terminal.

In the above embodiments, the port mapping method is assumed to set one transmission position for transmission. However, like 12 and 16 CSI-RS port configurations in Release 13, it is possible to generate 12, 16 or more CSI-RS ports such as 22, 24, 26, 28, 30, and 32 CSI-RS ports by setting a plurality of start positions and a number of antenna ports for each start position and combining the corresponding positions. In the above description, ports 0, 1, . . . , 15 are used, but they can be used as CSI-RS ports 15, 16, . . . , 30 as in LTE. It is also possible to generate 16 or more CSI-RS ports such as 22, 24, 26, 28, 30, and 32 CSI-RS ports.

In addition, the above configuration method can be used for configuring not only the non-zero power (NZP) CSI-RS but also the zero power (ZP) CSI-RS and the CSI-IM. Here, in the case of the ZP CSI-RS or the CSI-IM, the number of antenna ports is fixed to 4 and thus no antenna configuration is needed, and subsampling may be not applied. In addition, when the aperiodic CSI-IM includes both a CSI-RS related resource and a CSI-IM related resource in one field for each aperiodic CSI-RS, it is also possible to measure the channel at the CSI-RS position and measure the interference at the CSI-IM position when the corresponding field is indicated.

In addition, when the corresponding resource is transmitted in a partial band (RB, RBG, subband, and bandwidth part) other than the full band, a new DCI format may be defined to allocate it. The corresponding format can be defined using existing resource allocation types 0, 1 and 2 as proposed in the present invention. The aperiodic CSI-RS configuration may be based on the UL DCI format because it requires aperiodic channel status reporting. Here, to indicate uplink data transmission allocation and aperiodic CSI-RS transmission, one DCI format may be transmitted to the terminal or two DCI formats may be simultaneously transmitted to the terminal. In this case, an additional ID or RNTI may be required for aperiodic CSI-RS transmission. Thereby, the terminal may be allocated CSI-RS resources and may report the channel state by applying the indicated number of antenna ports, sub sampling, the number of antenna ports after subsampling, $P_C$ value, codebook subset restriction, and the like. Here, under an agreement that the aperiodic CSI-RS is transmitted in the subframe where the DCI is transmitted, the subframe configuration may be not included in the aperiodic CSI-RS configuration.

Fourth Embodiment

To perform aperiodic CSI-RS transmission using existing CSI-RS REs according to option 1 for time and frequency resource definition described in the first embodiment, zero power (ZP) CSI-RS information should be configured to transmit correct rate matching information to the terminal receiving both the CSI-RS and the PDSCH. The ZP CSI-RS resource can be configured according to the following two schemes.

1. Option 1 for ZP CSI-RS resource definition: configure the ZP CSI-RS in advance via RRC and use it as a pool for aperiodic CSI-RS transmission 2. Option 2 for ZP CSI-RS resource definition: dynamically configure the ZP CSI-RS via the DCI according to the situation and use it as a pool for aperiodic CSI-RS transmission Option 1 for ZP CSI-RS resource definition is a method that creates a pool for aperiodic CSI-RS transmission and allocates the aperiodic CSI-RS only in the pool.

Figure 12:
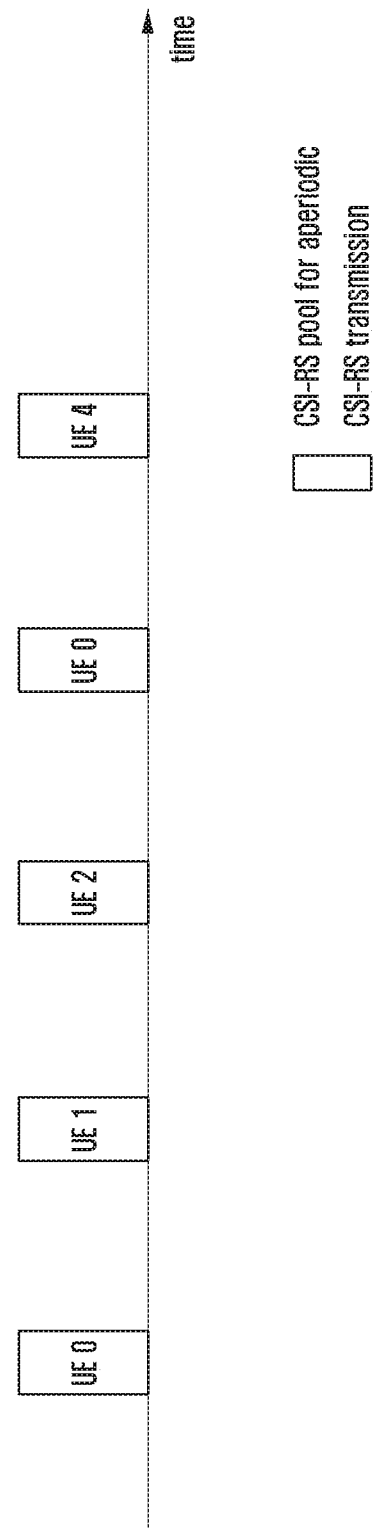
FIG. 12 depicts a situation where the ZP CSI-RS proposed in the present invention is configured in advance and the aperiodic CSI-RS is transmitted to each ZP CSI-RS terminal.

FIG. 12 shows an example where the base station creates a pool for the aperiodic CSI-RS and assigns the pool to each terminal.

With reference to FIG. 12, the base station can configure in advance a CSI-RS pool as shown in the form of a rectangle through the RRC setting. As there is no limit to the number of ZP CSI-RSs that can be configured in the current LTE system, the base station can allocate a large number of ZP CSI-RSs to the legacy terminal. Hence, a CSI-RS pool for aperiodic CSI-RS transmission can be set for the legacy terminal that does not support the aperiodic CSI-RS.

As the terminal knows in advance that the ZP CSI-RS is applied to a specific position, when the PDSCH is transmitted, it may determine that the PDSCH is not transmitted via the corresponding resource and perform rate matching accordingly. In the corresponding ZP CSI-RS, the base station can non-periodically allocate only a CSI-RS resource to the terminal. In this case, to non-periodically allocate the NZP CSI-RS, the base station must dynamically transmit the corresponding configuration to the terminal. In LTE, if the resource positions indicated by the ZP CSI-RS configuration and the NZP CSI-RS configuration are the same, the NZP CSI-RS configuration takes precedence. When the aperiodic CSI-RS is allocated, the corresponding resource is regarded by the terminal as the NZP CSI-RS, and thus it is possible to measure the channel in the corresponding resource. Although FIG. 12 shows an aperiodic CSI-RS transmission to only one terminal with a CSI-RS pool occupying one subframe, the aperiodic CSI-RS may be transmitted to multiple terminals. Also, as described above, the transmission unit may be a full subband or a partial subband. If the terminal supports aperiodic CSI-RS transmission using the appropriate method, for simultaneous support of the legacy terminal, the terminal may not expect transmission of an aperiodic CSI-RS resource that does not overlap with the ZP CSI-RS. Configuring the CSI-RS pool based on the semi-static ZP CSI-RS configuration has an advantage that it can operate smoothly with the legacy terminal. However, as the semi-static ZP CSI-RS must be allocated in advance for this purpose, the number of REs for PDSCH transmission can be reduced. This may cause a failure in achieving the effect of the aperiodic CSI-RS (i.e., increasing the system performance through efficient resource utilization).

Option 2 for ZP CSI-RS resource definition is a method that dynamically configures the ZP CSI-RS according to the situation through the DCI. Table 10 shows a resource configuration example for the ZP CSI-RS configuration.

TABLE 10

A-CSI-RS-ConfigZP-r14 ::=  SEQUENCE {
  a-csi-RS-ConfigZPId-r14   A-CSI-RS-ConfigZPId-r14,

TABLE 10-continued

| | |
|---|---|
| resourceConfigList-r11 | BIT STRING (SIZE (16)), |
| subframeConfig-r11 | INTEGER (0 ... 154), |
| ... | |
| } | |

Example of RRC settings for aperiodic ZP CSI-RS configuration

Here, the base station can deliver the corresponding configuration in the following manner.

1. Option 1 for dynamic ZP CSI-RS resource transmission: configure the resource via a signal of 1 bit
2. Option 2 for dynamic ZP CSI-RS resource transmission: configure the resource via a signal of 2 or more bits When the ZP CSI-RS resource is configured through a 1-bit signal using option 1 for dynamic ZP CSI-RS resource transmission, the terminal can check only the presence or absence of a ZP CSI-RS in the corresponding resource. In this method, when there is an aperiodic ZP CSI-RS, the terminal must assume that the ZP CSI-RS is always present in all subframes for all downlink resources allocated to the terminal for PDSCH transmission. In this case, even if the base station does not need to transmit the aperiodic NZP CSI-RS in all the bands allocated to the terminal, the terminal cannot assume that the PDSCH is transmitted via the corresponding resources, so that resources may be unnecessarily consumed. However, the signaling overhead for dynamic configuration can be minimized.

When the ZP CSI-RS resource is configured through a signal of 2 or more bits using option 2 for dynamic ZP CSI-RS resource transmission, the number of antenna ports and the start resource can be set in advance by RRC as in the third embodiment of the present invention. In this case, the terminal can identify not only the presence or absence of the ZP CSI-RS in the corresponding resource but also the position of the configured ZP CSI-RS. In this method, when the aperiodic ZP CSI-RS is present, the terminal may check whether there is a ZP CSI-RS in some downlink resources for PDSCH transmission. This setting is possible using an RRC field, and can be considered for all transmission units including the proposed CSI-RS transmission unit. Thus, the PDSCH can be decoded by assuming that the ZP CSI-RS is present in the corresponding resource overlapping the PDSCH transmission. This method allows more flexible and diverse aperiodic ZP CSI-RS transmissions, but it requires DCI overhead. Here, the transmitted DCI may be a common DCI applied to all the terminals to transmit ZP CSI-RS configuration information to the terminals in common. When using the common DCI, the DCI overhead can be reduced by multicasting the DCI to the terminals receiving the PDSCH rather than separately transmitting the DCI to the individual terminals. As the common DCI is commonly transmitted information, it can be transmitted in the common search space. To maintain the same number of PDCCH blind decodings as in the existing scheme, the common DCI can carry the same number of payload bits as the legacy PDCCH. Here, the bit not carrying information can be fixed to a specific value such as 0 or 1. Such multibit aperiodic ZP CSI-RS transmission may be performed based on Tables 7 and 8 described above. For this common DCI transmission, a ZP CSI-RS RNTI can be introduced. Since the common DCI is no longer UE-specific, it cannot be transmitted based on the RNTI set for each terminal and may require the corresponding RNTI information. Table 11 below illustrates the common RNTI configuration for ZP CSI-RS transmission.

TABLE 11

| | |
|---|---|
| ZP-DCI-Config-r14 ::= | SEQUENCE { |
| ... | |
| zp-csi-RS-RNTI | BIT STRING (SIZE (16)), |
| ... | |
| } | |

ZP CSI-RS RNTI Configuration

The RNTI in the above example is referred to as a ZP CSI-RS RNTI, but it may also be referred to as a common DCI RNTI or a CSI-RS RNTI. In addition to ZP CSI-RS information, the common DCI may include activation information of the aperiodic NZP CSI-RS transmission resource and trigger information of the RS transmission. Aperiodic CSI-RS resource configuration and triggering can be performed in the following three ways.

1. Option 1 for aperiodic CSI-RS resource configuration and triggering: configure a number of aperiodic CSI-RS resources in advance and trigger some of the configured resources
2. Option 2 for aperiodic CSI-RS resource configuration and triggering: configure a number of aperiodic CSI-RS resources in advance, activate some of the configured resources, and trigger some of the activated resources
3. Option 3 for aperiodic CSI-RS resource configuration and triggering: configure a number of aperiodic CSI-RS resources in advance, and periodically transmit the corresponding CSI-RS resource upon activation until it is deactivated Option 1 for aperiodic CSI-RS resource configuration and triggering is a method that configures a plurality of aperiodic CSI-RS resources in advance and triggers some of the configured resources. In this method, as a plurality of resources should always be configured dynamically and all the configured resources should be supported, the complexity of the terminal may be relatively large. Option 2 for aperiodic CSI-RS resource configuration and triggering is a method that dynamically transmits only some of the configured resources. In this method, as the number of transmittable CSI-RS resources is relatively small, the terminal complexity is reduced compared with option 1, and dynamic CSI-RS transmission is also possible. In option 3 for aperiodic CSI-RS resource configuration and triggering, a plurality of resources are configured and all or some of them are periodically transmitted based on the concept of semi-persistent scheduling (SPS). In this method, the hardware change and complexity increase of the terminal are relatively small compared with options 1 and 2.

Option 2 and option 3 for aperiodic CSI-RS resource configuration and triggering can coexist in one system. In this case, the following ways may be considered to distinguish the settings of trigger options 2 and 3.

1. Scheme 1 for setting the CSI-RS type: introduce an RRC field indicating whether trigger option 2 or 3 is set
2. Scheme 2 for setting the CSI-RS type: determine according to the presence or absence of subframe config Scheme 1 for setting the CSI-RS type is to introduce an RRC field indicating whether trigger option 2 or 3 is set. Table 12 below illustrates an RRC configuration in CSI-RS type setting scheme 1.

TABLE 12

```
CSI-RS-ConfigNZP-r11 ::=              SEQUENCE {
   csi-RS-ConfigNZId-r11                 CSI-RS-ConfigNZPId-r11,
   antennaPortsCount-r11                 ENUMERATED {an1, an2, an4, an8},
   resourceConfig-r11                    INTEGER (0 ... 31),
   subframeConfig-r11                    INTEGER (0 ... 154),
   scramblingIdentity-r11                INTEGER (0 ... 503),
   qcl-CRS-Info-r11                      SEQUENCE {
      qcl-ScramblingIdentity-r11            INTEGER (0 ... 503),
      crs-PortsCount-r11                    ENUMERATED {n1, n2, n4, spare1},
      mbsfn-SubframeConfigList-r11          CHOICE {
         release                              NULL,
         setup                                SEQUENCE {
            subframeConfigList                   MBSFN-SubframeConfigList
         }
      }                                                      OPTIONAL-- Need
ON
   }                                                         OPTIONAL,      -
- Need OR
   ...,
   [[ csi-RS-ConfigNZPId-v1310           CSI-RS-ConfigNZPId-v1310       OPTIONAL,
   -- Need ON
   ]]
   [[ aperiodic-RS-Type-r14              ENUMERATED {one-shot, multi-shot}
   OPTIONAL -- Need ON
   ]]
}
```

Illustration of CSI-RS Type Setting Scheme 1

In addition to the existing Release 13 LTE CSI-RS configuration field, the terminal may be configured with the aperiodic-RS-Type-r14 field. If the aperiodic-RS-Type-r14 field is not configured, the terminal may determine that this CSI-RS configuration is for the existing periodic CSI-RS other than the aperiodic CSI-RS. If the aperiodic-RS-Type-r14 field is configured, the terminal can determine the corresponding resource as a resource that can be activated and deactivated for the aperiodic CSI-RS transmission operation described above. Here, if the aperiodic-RS-Type-r14 field is set as one-shot, the terminal may determine that the corresponding CSI-RS resource is in the form of the CSI-RS transmitted in one subframe according to trigger option 2 described above. In this case, existing subframe-config-r11 is not required and should be ignored. If the aperiodic-RS-Type-r14 field is set as multi-shot, the terminal may determine the corresponding CSI-RS resource as a resource that can be activated or deactivated and transmitted in multiple subframes according to trigger option 3 described above. In this case, when the CSI-RS resource is activated by subframe config, the CSI-RS is transmitted according to subframe config.

Scheme 2 for setting the CSI-RS type is a method of distinguishing between trigger option 2 and trigger option 3 depending on the presence of subframe config. As described above, trigger options 2 and 3 may not require other settings other than subframe config. Hence, if there is no subframe config in the configuration of Table 9, the terminal may determine that the CSI-RS is transmitted in one subframe according to trigger option 2; and if there is subframe config, the terminal may determine the corresponding CSI-RS resource as a resource that can be activated or deactivated and transmitted in multiple subframes according to trigger option 3.

To support the aperiodic CSI-RS transmission, the activation/deactivation operation and the triggering operation may be indicated via DCI or MAC CE signaling. Additionally, in association with the above-described triggering method, it is possible to support multiple CSI-RS transmission methods. One possible way is to allow trigger option 2 and trigger option 3 to be configured together, and notify their supportability via the UE capability. Hence, if the terminal supports both trigger option 2 and trigger option 3, the base station can freely select one of them and configure it; and if the UE capability of the terminal supports only one option, the base station may allow the option to be used. For the above selective support, the UE capability signal may be supported in the following manner.

In the first UE capability support method, multiple capabilities are independently set for aperiodic CSI-RS transmission, and when a particular capability supports aperiodic CSI-RS transmission, one of the trigger options (e.g., trigger options 2 and 3) is selected according to the capability. This method can reduce the terminal complexity by allowing the terminal to support one of the two aperiodic CSI-RS schemes rather than supporting both.

In the second UE capability support method, multiple capabilities are independently set for aperiodic CSI-RS transmission, and when a particular capability supports aperiodic CSI-RS transmission, a UE capability signaling field for the option requiring higher complexity is additionally secured to reduce signaling overhead. For example, trigger option 2 requires a higher complexity than trigger option 3, and thus it may be natural for the terminal supporting trigger option 2 to support trigger option 3. Hence, if the terminal supports aperiodic CSI-RS transmission and the capability supporting trigger option 2 indicates support of trigger option 2, the terminal may support both trigger option 2 and trigger option 3; and if trigger option 2 is not supported, the terminal may naturally support trigger option 3 only.

In supporting the UE capability, if the terminal does not support aperiodic CSI-RS transmission, the field for supporting an additional aperiodic CSI-RS transmission type may be not set or may be ignored even if it is set.

The UE capability may provide the terminal with only one configuration field and may be used for all bands or band combinations. It is also possible to reduce the hardware complexity of the terminal by providing a separate field for each band or band combination to optimize the hardware for each band or band combination.

In supporting the aperiodic CSI-RS transmission, PQI (PDSCH-RE-mapping quasi co-location information) supported by TM10 may be considered. Table 13 below shows a PQI information setting field.

TABLE 13

```
PD SCH-RE-MappingQCL-Config-r11 ::=    SEQUENCE {
    pdsch-RE-MappingQCL-ConfigId-r11       PDSCH-RE-MappingQCL-ConfigId-r11,
    optionalSetOfFields-r11                SEQUENCE {
        crs-PortsCount-r11                     ENUMERATED {n1, n2, n4, spare1},
        crs-FreqShift-r11                      INTEGER (0 . . . 5),
        mbsfn-SubframeConfigList-r11           CHOICE {
            release                                NULL,
            setup                                  SEQUENCE {
                subframeConfigList                     MBSFN-SubframeConfigList
            }
        }                                                  OPTIONAL, -- Need ON
        pdsch-Start-r11                        ENUMERATED {reserved, n1, n2, n3, n4,
assigned}
    }                                                      OPTIONAL, -- Need OP
    csi-RS-ConfigZPId-r11                  CSI-RS-ConfigZPId-r11,
    qcl-CSI-RS-ConfigNZPId-r11             CSI-RS-ConfigNZPId-r11 OPTIONAL,-- Need OR
 . . .
}
```

PQI Information Setting Field

Via the PQI field, the base station transmits the terminal the PDSCH transmission start time, the ZP CSI-RS information, and the quasi co-located NZP CSI-RS information together at the time of the corresponding transmission. QCL (quasi co-location) is of type A or type B. For QCL type A, it is assumed that the CRS, CSI-RS and DMRS are QCLed in terms of delay spread, Doppler spread, Doppler shift, and average delay. For QCL type B, the CRS can support information about Doppler spread and Doppler shift only, and other information should be obtained through the CSI-RS. The QCL support for aperiodic CSI-RS transmission may be different from the QCL support for periodic CSI-RS transmission. The QCL support for aperiodic CSI-RS transmission may be performed in the following way.

In the first QCL support method for aperiodic CSI-RS transmission, the QCL assumption is not supported for the corresponding DMRS transmission in the case of aperiodic CSI-RS transmission. The aperiodic CSI-RS transmission may be full-band transmission, but if the system bandwidth is narrow, the estimation of the corresponding information may be limited. Hence, the corresponding information can be supported through the existing CRS or periodic CSI-RS transmission. In this case, the terminal cannot receive the CSI-RS resource or the CSI-RS ID configured as the aperiodic CSI-RS through the PQI field, and only the existing CRS and periodic CSI-RS transmission should be indicated by the corresponding field. Hence, even when the terminal generates and reports channel state information based on the aperiodic CSI-RS, the terminal estimates the delay spread, Doppler spread, Doppler shift, and average delay based on the CRS and periodic CSI-RS transmission and decodes the DMRS on the basis of this estimated information.

In the second QCL support method for aperiodic CSI-RS transmission, the QCL assumption for the corresponding DMRS transmission is supported only from the CRS associated with the CSI-RS indicated by the PQI field in the case of aperiodic CSI-RS transmission. In this method, the QCL information of the corresponding channel can be obtained through the CRS. In this case, unlike estimating information using both the CSI-RS and the CRS, the delay spread, Doppler spread, Doppler shift, and average delay are estimated based on the CRS only, and the DMRS is decoded on the basis of the estimated information. This method is operable when the CSI-RS set in the PQI field is an aperiodic CSI-RS or a CSI-RS ID indicating a resource configured as an aperiodic CSI-RS.

In the third QCL support method for aperiodic CSI-RS transmission, the existing QCL assumption of QCL type A or type B is maintained even in the case of aperiodic CSI-RS transmission. With this method, the additional hardware implementation complexity of the terminal can be minimized. In this option, the base station estimates the delay spread, Doppler spread, Doppler shift, and average delay based on the aperiodic CSI-RS different from the existing periodic CSI-RS, and decodes the DMRS based on this estimated information. Hence, the CSI-RS resource indicated by the PQI field or indicated by the CSI-RS ID supports aperiodic CSI-RS transmission, and the terminal may preform estimation and decode the DMRS based on the corresponding aperiodic CSI-RS.

Different QCL support schemes may be considered for the three QCL support methods and the three aperiodic CSI-RS trigger options. For example, in aperiodic CSI-RS trigger option 1 or 2, as CSI-RS transmission is assumed in one subframe, it may be difficult to obtain QCL information, especially Doppler-related information. Hence, for these trigger options, the first or second QCL support method can be used. In the case of trigger option 3, as the CSI-RS is periodically transmitted in a given interval after activation, relatively sufficient estimation performance can be obtained, and thus QCL may be supported in a conventional manner. In such a case, if the CSI-RS resource or the CSI-RS ID indicated by the base station to the terminal through the PQI is an aperiodic CSI-RS transmitted in one subframe according to trigger option 2, this setting may be not allowed. If the CSI-RS resource or the CSI-RS ID indicated by the base station to the terminal through the PQI is an aperiodic CSI-RS transmitted in one subframe according to trigger option 3, this setting may be allowed. Even if the base station is allowed to configure the CSI-RS according to CSI-RS trigger option 1 or 2, the terminal may determine the configuration to be wrong and ignore it. In addition, the combination of these QCL methods or options may vary depending on the amount of transmission in the aperiodic CSI-RS transmission. For example, when the transmission time is set in advance for the CSI-RS transmission resource, if the set transmission time expires, the legacy QCL setting can be applied. For the PQI indication and QCL configuration, the corresponding method can be similarly applied to the ZP CSI-RS configuration. In other words, the ZP CSI-RS configuration set by trigger option 3 indicates the ZP CSI-RS using the PQI, and the ZP CSI-RS configuration set by trigger options 1 and 2 triggers using a separate DCI field.

It may be possible to trigger the ZP CSI-RS configuration set by trigger option 3 using at least one of a PQI field or a separate DCI field.

The combination of these QCL methods or options may vary depending on the RRC setting of the base station. Table 14 below shows the existing QCL configuration field.

trigger option 3 is required. In the case of the terminal that simultaneously supports plural types of CSI-RSs, a PQI field for CoMP transmission and a DCI field for ZP CSI-RS configuration can be separately set, the ZP CSI-RS configuration indicated by the PQI field and the aperiodic ZP CSI-RS indicated by the DCI field can be used in combi-

TABLE 14

```
PDSCH-ConfigDedicated-v1130 ::=    SEQUENCE {
    dmrs-ConfigPDSCH-r11       DMRS-Config-r11                    OPTIONAL, -- Need ON
    qcl-Operation              ENUMERATED {typeA, typeB }         OPTIONAL, -- Need OR
    re-MappingQCLConfigToReleaseList-r11  RE-MappingQCLConfigToReleaseList-r11    OPTIONAL, -- Need
ON
    re-MappingQCLConfigToAddModList-r11         RE-MappingQCLConfigToAddModList-r11    OPTIONAL
    -- Need ON
}
```

Existing QCL Configuration Field

As described above, the base station notifies the QCL type (i.e., type A or type B) for the corresponding transmission to the terminal, and the terminal obtains information regarding the delay spread, the Doppler spread, the Doppler shift, and the average delay accordingly. The QCL configuration can be added for aperiodic CSI-RS transmission, and the first QCL support method and the second QCL support option, which are not supported before, can be indicated respectively by QCL type C and type D. Table 15 below illustrates a QCL configuration field for aperiodic CSI-RS transmission.

nation according to the situation. The aperiodic ZP CSI-RS configurations indicated by the PQI field and a separate DCI field may be combined in the following way.

1. Method 1 for combining aperiodic ZP CSI-RSs indicated by PQI and DCI fields: perform rate matching in consideration of the two ZP CSI-RS configurations.

2. Method 2 for combining aperiodic ZP CSI-RSs indicated by PQI and DCI fields: perform rate matching by selecting the PQI field indication.

3. Method 3 for combining aperiodic ZP CSI-RSs indicated by PQI and DCI fields: perform rate matching by selecting the DCI field indication.

TABLE 15

```
PDSCH-ConfigDedicated-v14 ::=      SEQUENCE {
    dmrs-ConfigPDSCH-r14       DMRS-Config-r11                    OPTIONAL, -- Need ON
    qcl-Operation-r14          ENUMERAIED {typeA, typeB, typeC }  OPTIONAL, -- Need OR
    re-MappingQCLConfigToReleaseList-r11  RE-MappingQCLConfigToReleaseList-r11    OPTIONAL,
    -- Need ON
    re-MappingQCLConfigToAddModList-r11         RE-MappingQCLConfigToAddModList-r11
    OPTIONAL -- Need ON
}
```

QCL Configuration Field Considering Aperiodic CSI-RS Transmission

In Table 15, one of the first and second methods for QCL support has been added as QCL type C (there are three QCL types), but both methods may be considered and QCL type D may also be supported.

In the case of trigger option 1 or 2, as described above, the QCL indication may be not issued through the PQI. This means that the corresponding CSI-RS cannot be used for CoMP transmission. Hence, when the aperiodic ZP CSI-RS described above is configured using one bit or two or more bits as illustrated in Table 7 or Table 8, this configuration can be received as follows through the DCI.

1. DCI transmission option 1 for the aperiodic ZP CSI-RS configuration: add an additional bit to the existing DCI field 2. DCI transmission option 2 for the aperiodic ZP CSI-RS configuration: reuse the existing PQI field positions 3. DCI transmission option 3 for the aperiodic ZP CSI-RS configuration: use the existing PQI field or a new DCI indication depending on the configuration of the base station In DCI transmission option 1, an additional bit is added to the existing DCI field for reception. When the base station configures an aperiodic CSI-RS based on trigger option 1 or 2, the terminal cannot support CoMP transmission based on the aperiodic CSI-RS. Hence, to support CoMP transmission, the CSI-RS based on the existing periodic CSI-RS or In method 1 for combining aperiodic ZP CSI-RSs indicated by PQI and DCI fields, rate matching is performed in consideration of the two ZP CSI-RS configurations. If a terminal simultaneously supports a periodic CSI-RS in one TP and an aperiodic CSI-RS in another TP in a CoMP situation, the terminal needs to consider two ZP CSI-RSs simultaneously. In particular, when the dynamic point selection (DPS) is performed on the frequency domain, the terminal must perform rate matching by considering two ZP CSI-RS settings at the same time, and thus combination method 1 can improve the performance by supporting this type of transmission.

In method 2 for combining aperiodic ZP CSI-RSs indicated by PQI and DCI fields, rate matching is performed by selecting the PQI field indication. When the terminal simultaneously supports a periodic CSI-RS in one TP and an aperiodic CSI-RS in another TP in a CoMP situation, this method supports only one TP in terms of frequency while giving priority to the CoMP transmission.

In method 3 for combining aperiodic ZP CSI-RSs indicated by PQI and DCI fields, rate matching is performed by selecting the DCI field indication. When the terminal simultaneously supports a periodic CSI-RS in one TP and an aperiodic CSI-RS in another TP in a CoMP situation, this method supports only one TP in terms of frequency while giving priority to the data transmission at the main TP sending the CRS to the terminal.

Here, combination method 2 and combination method 3 can be used together according to the DCI field indication. For example, when the indication field of Table 8 is used for ZP CSI-RS transmission, priority is given to the indication of the PQI field if the DCI field is set to a value of '00' indicating no ZP CSI-RS transmission; and priority is given to the indication of the DCI field if the DCI field is set to any other value. In addition, the base station may transmit a 1-bit signal to enable the terminal to determine the field to be used for ZP CSI-RS rate matching. For example, the terminal may perform rate matching according to the indication of the PQI field if the signaling bit is set to 0, and perform rate matching according to the DCI field if the signaling bit is set to 1.

In DCI transmission option 2 for the aperiodic ZP CSI-RS configuration, the indication field shown in Table 8 or 9 is transmitted instead of the existing PQI field positions. As described above, the terminal using only the aperiodic CSI-RS according to trigger option 1 or 2 may be not able to perform the CoMP operation. Hence, instead of transmitting the PQI to such a terminal, the DCI overhead can be reduced and the coverage can be increased by replacing the corresponding bits with the DCI indicating information for aperiodic ZP CSI-RS transmission.

In DCI transmission option 3 for the aperiodic ZP CSI-RS configuration, the existing PQI field or a new DCI indication is received according to the base station setting. For example, when the base station sets a 1-bit configuration, it is possible to determine whether to use the bit as PQI or a setting field for the aperiodic ZP CSI-RS. In other words, if the received 1 bit is set to 0, the terminal may interpret the bit as a PQI field and perform a CoMP operation according to the QCL and PQI field settings. If the received 1 bit is set to 1, the terminal may interpret the bit as a bit for aperiodic ZP CSI-RS configuration and interpret it as an indication field shown in Table 8 or 9 to perform rate matching. This configuration can be delivered via an additional DCI, and can also be set via RRC. When configured via the DCI, it is possible to dynamically switch between the aperiodic ZP CSI-RS and the PQI indication. When configured via RRC, such dynamic switching is not possible, but the DCI coverage can be improved.

Figure 13:
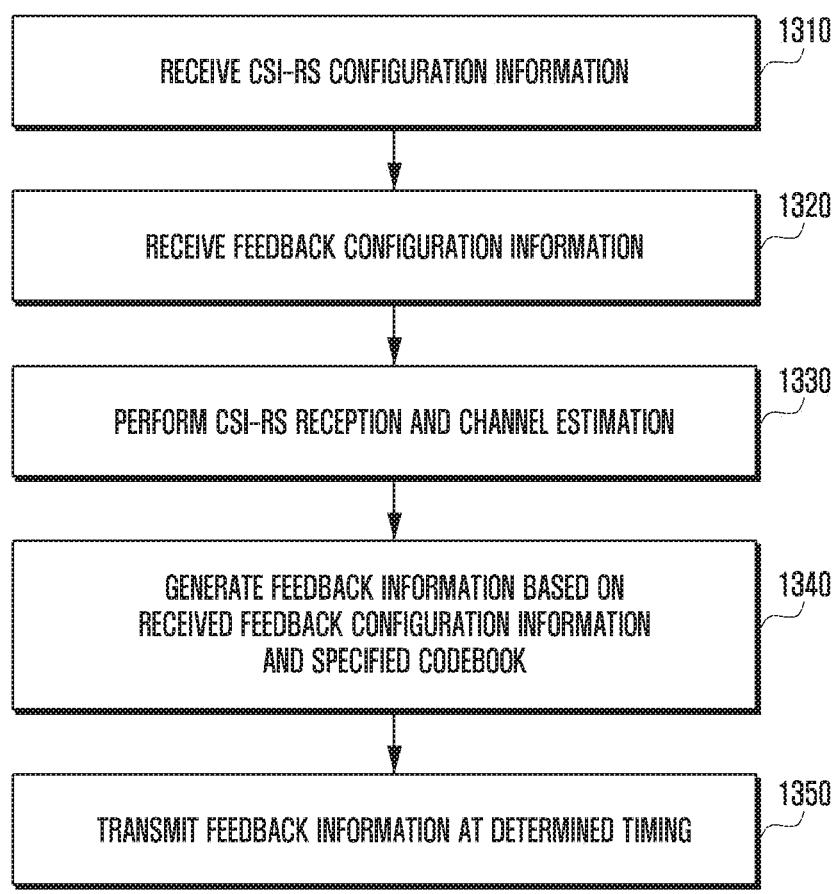
FIG. 13 is a flowchart illustrating operations of the terminal according to an embodiment of the present invention.

FIG. 13 is a flowchart illustrating operations of the terminal according to an embodiment of the present invention.

With reference to FIG. 13, at step 1310, the terminal receives configuration information for the aperiodic CSI-RS. Based on the received configuration information, the terminal may identify at least one piece of information regarding the number of ports for each aperiodic CSI-RS, the number of antennas per dimension N1 and N2, the oversampling factors per dimension O1 and O2, one piece of subframe config for transmitting multiple CSI-RSs, multiple pieces of resource config to set the position, the codebook subset restriction, CSI reporting, the CSI-process index, and the transmission power.

Thereafter, at step 1320, the terminal receives feedback configuration information based on at least one CSI-RS position. This information may include information regarding the PMI/CQI period and offset, the RI period and offset, wideband/subband indication, and the submode.

At step 1340, the terminal receives a plurality of CSI-RSs in one subframe based on the configuration information, and estimates the channel between the antennas of the base station and the reception antennas of the terminal on the basis of the received CSI-RSs.

The terminal generates the feedback information rank, PMI, and CQI using the received feedback configuration at step 1340 on the basis of the estimated channel and a virtual channel added between the aperiodic CSI-RSs.

Thereafter, at step 1350, the terminal transmits the feedback information to the base station at a feedback timing determined according to the feedback configuration of the base station, thereby completing the channel feedback generation and reporting process in consideration of the two-dimensional arrangement.

Figure 14:
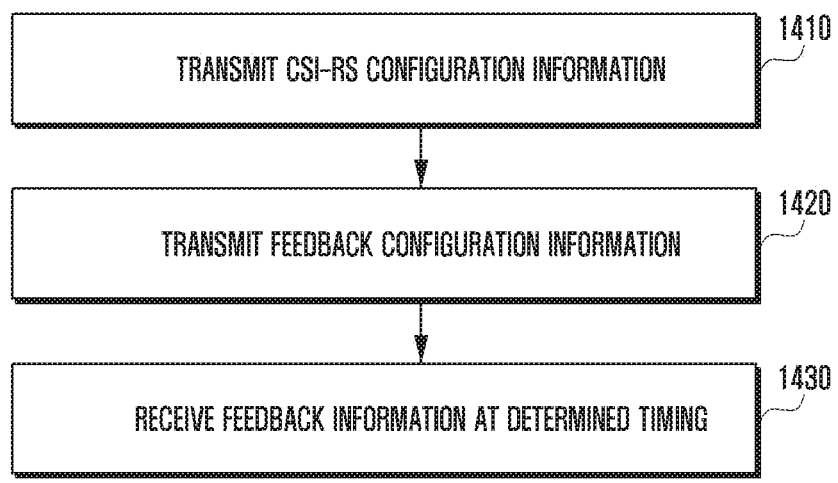
FIG. 14 is a flowchart illustrating operations of the base station according to an embodiment of the present invention.

FIG. 14 is a flowchart illustrating operations of the base station according to an embodiment of the present invention.

With reference to FIG. 14, at step 1410, the base station transmits the terminal configuration information on the CSI-RS for channel measurement. The configuration information may include at least one piece of information regarding the number of ports for each aperiodic CSI-RS, the number of antennas per dimension N1 and N2, the oversampling factors per dimension O1 and O2, one piece of subframe config for transmitting multiple CSI-RSs, multiple pieces of resource config to set the position, the codebook subset restriction, CSI reporting, the CSI-process index, and the transmission power.

Thereafter, at step 1420, the base station transmits the terminal feedback configuration information based on at least one aperiodic CSI-RS. This information may include information regarding the PMI/CQI period and offset, the RI period and offset, wideband/subband indication, and the submode. Then, the base station transmits the configured CSI-RS to the terminal. The terminal estimates the channel for each antenna port and estimates an additional channel for a virtual resource based on the channel estimation result. The terminal determines the feedback, generates the corresponding PMI, RI, and CQI, and transmits the generated information to the base station.

At step 1430, the base station receives feedback information from the terminal at a given timing, and may utilize the feedback information to examine the state of the channel between the terminal and the base station.

Figure 15:
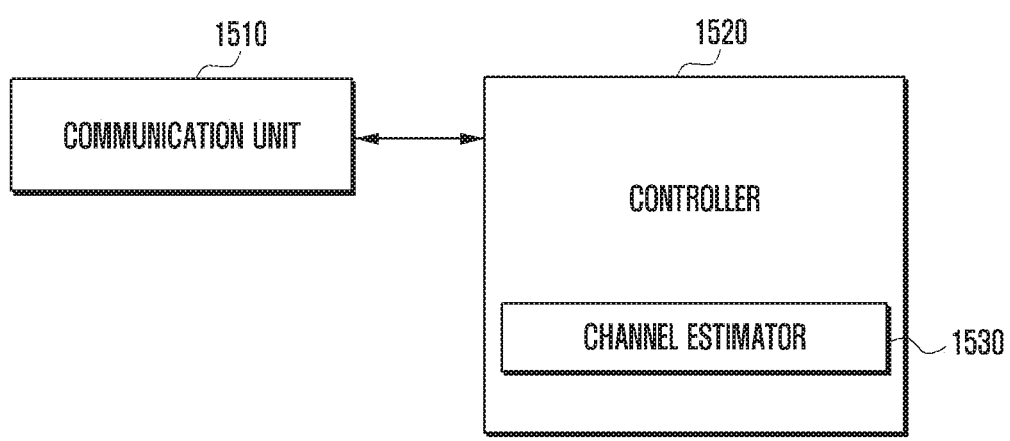
FIG. 15 is a block diagram of a terminal according to an embodiment of the present invention.

FIG. 15 is a block diagram of a terminal according to an embodiment of the present invention.

With reference to FIG. 15, the terminal includes a communication unit 1510 and a controller 1520. The communication unit 1510 transmits or receives data to or from the outside (e.g., base station). Here, the communication unit 1510 can transmit feedback information to the base station under the control of the controller 1520. The controller 1520 controls the states and operations of all the components constituting the terminal. Specifically, the controller 1520 generates feedback information according to information allocated from the base station. The controller 1520 controls the communication unit 1510 to feedback the generated channel information to the base station according to the timing information allocated from the base station. To this end, the controller 1520 may include a channel estimator 1530. The channel estimator 1530 determines required feedback information based on the CSI-RS and feedback allocation information received from the base station, and estimates the channel using the received CSI-RS based on the feedback information. The channel estimator 1530 decodes the PDSCH based on the PRG size and the rank corresponding to the PDSCH transmission described in embodiments of the present invention and by applying the reference signal mapping to the DMRS port with an applied precoder on the basis of the DCI received from the base station. In FIG. 15, the terminal is depicted as having the communication unit 1510 and the controller 1520. However, without being limited thereto, the terminal may further include various components according to their functions in the terminal. For example, the terminal may further include a display to display the current state of the terminal, an input unit to receive an input signal from the user for function execution, and a storage to store data generated in the terminal. Although the channel estimator 1530 is depicted as being included in the controller 1520 in the above description, the present invention is not limited thereto. The controller 1520 may control the communication unit 1510 to receive configuration information for each of reference signal resources from the base station. The controller 1520 may also control the communication unit 1510 to measure the at least one reference signal and to receive feedback configuration information from the base station so as to generate feedback information according to the measurement results.

The controller 1520 may measure at least one reference signal received through the communication unit 1510 and generate feedback information according to the feedback configuration information. The controller 1520 may control the communication unit 1510 to transmit the generated feedback information to the base station at the feedback timing determined according to the feedback configuration information. The controller 1520 may receive the CSI-RS (channel status indication-reference signal) from the base station, generate feedback information based on the received CSI-RS, and transmit the generated feedback information to the base station. Here, the controller 1520 may select a precoding matrix for each antenna port group of the base station, and may select an additional precoding matrix based on the relationship between the antenna port groups of the base station.

The controller 1520 may receive the CSI-RS from the base station, generate feedback information based on the received CSI-RS, and transmit the generated feedback information to the base station. Here, the controller 1520 may select one precoding matrix for all antenna port groups of the base station. The controller 1520 may receive feedback configuration information from the base station, receive the CSI-RS from the base station, generate feedback information based on the received feedback configuration information and the received CSI-RS, and transmit the generated feedback information to the base station. Here, the controller 1520 may receive feedback configuration corresponding to each antenna port group of the base station and additional feedback configuration based on the relationship between the antenna port groups of the base station.

Figure 16:
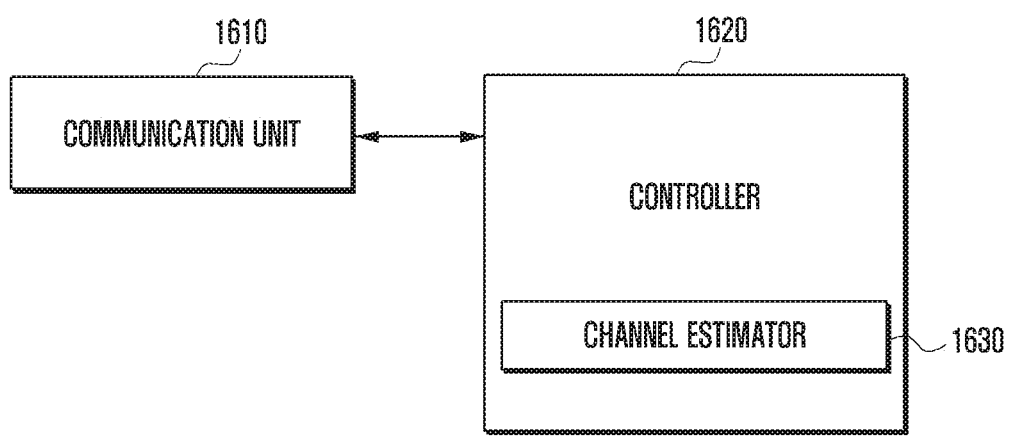
FIG. 16 is a block diagram of a base station according to an embodiment of the present invention.

FIG. 16 is a block diagram of a base station according to an embodiment of the present invention.

With reference to FIG. 16, the base station includes a controller 1610 and a communication unit 1620. The controller 1610 controls states and operations of all the components constituting the base station. Specifically, the controller 1610 allocates CSI-RS resources for channel estimation to the terminal and allocates feedback resources and feedback timings to the terminal. To this end, the controller 1610 may include a resource allocator 1630. The controller 1610 allocates feedback configurations and feedback timings so that feedbacks from plural terminals do not collide, and receives feedback information at the set timing to analyze the feedback information. The communication unit 1620 transmits or receives data, reference signals, and feedback information to or from the terminal Here, the communication unit 1620 transmits the aperiodic CSI-RS to the terminal through the allocated resources, and receives the feedback on the channel information from the terminal under the control of the controller 1610. In the above description, the resource allocator 1630 is included in the controller 1610, but the present invention is not limited thereto. The controller 1610 may control the communication unit 1620 to transmit configuration information for each of at least one reference signal to the terminal, or may generate the at least one reference signal. The controller 1610 may control the communication unit 1620 to transmit feedback configuration information to the terminal so as to generate feedback information according to measurement results. The controller 1610 may control the communication unit 1620 to transmit the at least one reference signal to the terminal and to receive feedback information from the terminal at a feedback timing determined according to the feedback configuration information. The controller 1610 may transmit feedback configuration information to the terminal, transmit the aperiodic CSI-RS to the terminal, and receive feedback information generated based on the feedback configuration information and the CSI-RS from the terminal Here, the controller 1610 may transmit feedback configuration information corresponding to each antenna port group of the base station and additional feedback configuration information based on the relationship between the antenna port groups. The controller 1610 may transmit the terminal the CSI-RS beamformed based on the feedback information, and may receive feedback information generated based on the CSI-RS from the terminal. According to the embodiments of the present invention described above, it is possible to prevent the base station that has a large number of transmit antennas with two-dimensional array structures from allocating excessive feedback resources for CSI-RS transmission. It is also possible to prevent an increase in channel estimation complexity of the terminal. The terminal can measure all the channels for a large number of transmit antennas, compose feedback information based on the measurement results, and report the feedback information to the base station in an effective manner.

Hereinabove, embodiments of the present invention have been described with reference to the accompanying drawings. Specific terms or words used in the description should be construed in accordance with the spirit of the present invention without limiting the subject matter thereof. It should be understood that many variations and modifications of the basic inventive concept described herein will still fall within the spirit and scope of the present invention as defined in the appended claims and their equivalents.

The invention claimed is:

1. A method performed by a terminal in a mobile communication system, the method comprising:
    receiving, from a base station, first information indicating a mode of a channel state information-reference signal (CSI-RS) as one of an aperiodic mode or a semi-persistent mode, and at least one second information associated with a set of physical downlink shared channel (PDSCH) parameters related to resource element mapping and quasi co-location, the first information and the at least one second information being received by a higher layer signaling;
    receiving, from the base station, control information indicating one of the at least one second information; and
    receiving, from the base station, the CSI-RS according to the mode of the CSI-RS indicated by the first information and a PDSCH based on the indicated second information.

2. The method of claim 1, wherein, in case that the first information is associated with the aperiodic mode, the second information indicated by the control information does not include information on a CSI-RS resource that is quasi co-located with PDSCH antenna ports.

3. The method of claim 2, further comprising receiving information on at least one non-zero power CSI-RS configuration associated with the aperiodic mode or the semi-persistent mode.

4. The method of claim 1, wherein, in case that the first information is associated with the semi-persistent mode, the second information indicated by the control information does not include information on a CSI-RS resource that is quasi-co-located with PDSCH antenna ports corresponding to a deactivated CSI-RS resource.

5. A method performed by a base station in a mobile communication system, the method comprising:
   transmitting, to a terminal, first information indicating a mode of a channel state information-reference signal (CSI-RS) as one of an aperiodic mode or a semi-persistent mode, and at least one second information associated with a set of physical downlink shared channel (PDSCH) parameters related to resource element mapping and quasi co-location, the first information and the at least one second information being transmitted by a higher layer signaling;
   transmitting, to the terminal, control information indicating one of the at least one second information; and
   transmitting, to the terminal, the CSI-RS according to the mode of the CSI-RS indicated by the first information and a PDSCH based on the indicated second information.

6. The method of claim 5, wherein, in case that the first information is associated with the aperiodic mode, the second information indicated by the control information does not include information on a CSI-RS resource that is quasi co-located with PDSCH antenna ports, and
   wherein, in case that the first information is associated with the semi-persistent mode, the second information indicated by the control information does not include information on a CSI-RS resource that is quasi co-located with PDSCH antenna ports corresponding to a deactivated CSI-RS resource.

7. The method of claim 6, further comprising transmitting information on at least one non-zero power CSI-RS configuration associated with the aperiodic mode or the semi-persistent mode.

8. A terminal in a mobile communication system, comprising:
   a transceiver configured to transmit and receive a signal; and
   a controller associated with the transceiver and configured to:
      receive, from a base station, first information indicating a mode of a channel state information-reference signal (CSI-RS) as one of an aperiodic mode or a semi-persistent mode, and at least one second information associated with a set of physical downlink shared channel (PDSCH) parameters related to resource element mapping and quasi co-location, the first information and the at least one second information being received by a higher layer signaling,
      receive, from the base station, control information indicating one of the at least one second information, and
      receive, from the base station, the CSI-RS according to the mode of the CSI-RS indicated by the first information and a PDSCH based on the indicated second information.

9. The terminal of claim 8, wherein, in case that the first information is associated with the aperiodic mode, the second information indicated by the control information does not include information on a CSI-RS resource that is quasi co-located with PDSCH antenna ports.

10. The terminal of claim 9, wherein the controller further configured to receive information on at least one non-zero power CSI-RS configuration associated with the aperiodic mode or the semi-persistent mode.

11. The terminal of claim 8, wherein, in case that the first information is associated with the semi-persistent mode, the second information indicated by the control information does not include information on a CSI-RS resource that is quasi-co-located with PDSCH antenna ports corresponding to a deactivated CSI-RS resource.

12. A base station in a mobile communication system, comprising:
   a transceiver configured to transmit and receive a signal; and
   a controller associated with the transceiver and configured to:
      transmit, to a terminal, first information indicating a mode of a channel state information-reference signal (CSI-RS) as one of an aperiodic mode or a semi-persistent mode, and at least one second information associated with a set of physical downlink shared channel (PDSCH) parameters related to resource element mapping and quasi co-location, the first information and the at least one second information being transmitted by a higher layer signaling,
      transmit, to the terminal, control information indicating one of the at least one second information, and
      transmit, to the terminal, the CSI-RS according to the mode of the CSI-RS indicated by the first information and a PDSCH based on the indicated second information.

13. The base station of claim 12, wherein, in case that the first information is associated with the aperiodic mode, the second information indicated by the control information does not include information on a CSI-RS resource that is quasi-co-located with PDSCH antenna ports.

14. The base station of claim 13, wherein the controller further configured to transmit information on at least one non-zero power CSI-RS configuration associated with the aperiodic mode or the semi-persistent mode.

15. The base station of claim 12, wherein, in case that the first information is associated with the semi-persistent mode, the second information indicated by the control information does not include information on a CSI-RS resource that is quasi-co-located with PDSCH antenna ports corresponding to a deactivated CSI-RS resource.

* * * * *